(12) United States Patent
Takeuchi

(10) Patent No.: US 6,898,023 B2
(45) Date of Patent: May 24, 2005

(54) ZOOM LENS

(75) Inventor: Hotaka Takeuchi, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/625,475

(22) Filed: Jul. 22, 2003

(65) Prior Publication Data

US 2004/0125463 A1 Jul. 1, 2004

(30) Foreign Application Priority Data

Jul. 22, 2002 (JP) ........................................ 2002-212467

(51) Int. Cl.$^7$ ............................................. G02B 15/14
(52) U.S. Cl. ........................................ 359/689; 359/676
(58) Field of Search ................................... 359/676–692

(56) References Cited

U.S. PATENT DOCUMENTS

| 5,648,835 A | 7/1997 | Uzawa |
| 6,339,508 B1 | 1/2002 | Nozawa et al. |
| 2003/0179464 A1 * | 9/2003 | Amanai ........................ 359/685 |
| 2003/0214726 A1 * | 11/2003 | Mihara ........................ 359/676 |

FOREIGN PATENT DOCUMENTS

| JP | 09-211287 | 8/1997 |
| JP | 2000-187160 | 7/2000 |

OTHER PUBLICATIONS

Patent Abstracts of Japan for JP09–211287 published on Aug. 15, 1997.
Patent Abstracts of Japan for JP2000–187160 published on Jul. 4, 2000.

* cited by examiner

Primary Examiner—Georgia Epps
Assistant Examiner—M. Hasan
(74) Attorney, Agent, or Firm—Darby & Darby

(57) ABSTRACT

The present invention provides a small, thin, light and low cost zoom lens suitable for cellular telephones, portable information terminals, etc. In particular, it can provide a small and thin, high performance zoom lens having a zoom ratio of approximately 2, a depth of less than 9 mm during shooting and in storage, a total lens length of less than 30 mm, an angle of view of approximately 61°, and a F number of approximately 2.8 providing a sufficient light, with various aberrations all suitably corrected.

23 Claims, 21 Drawing Sheets

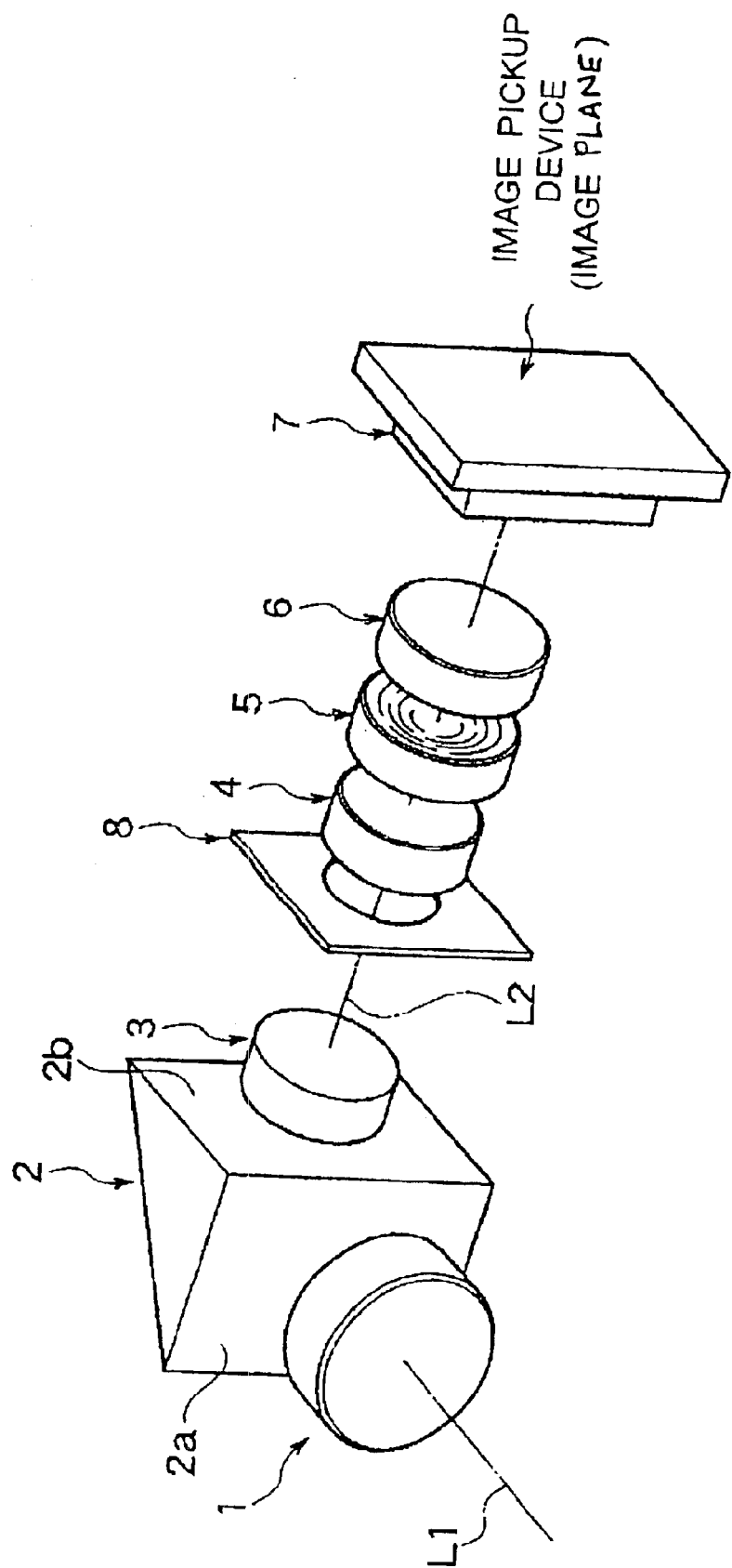

FIG. 8A
FIG. 8B
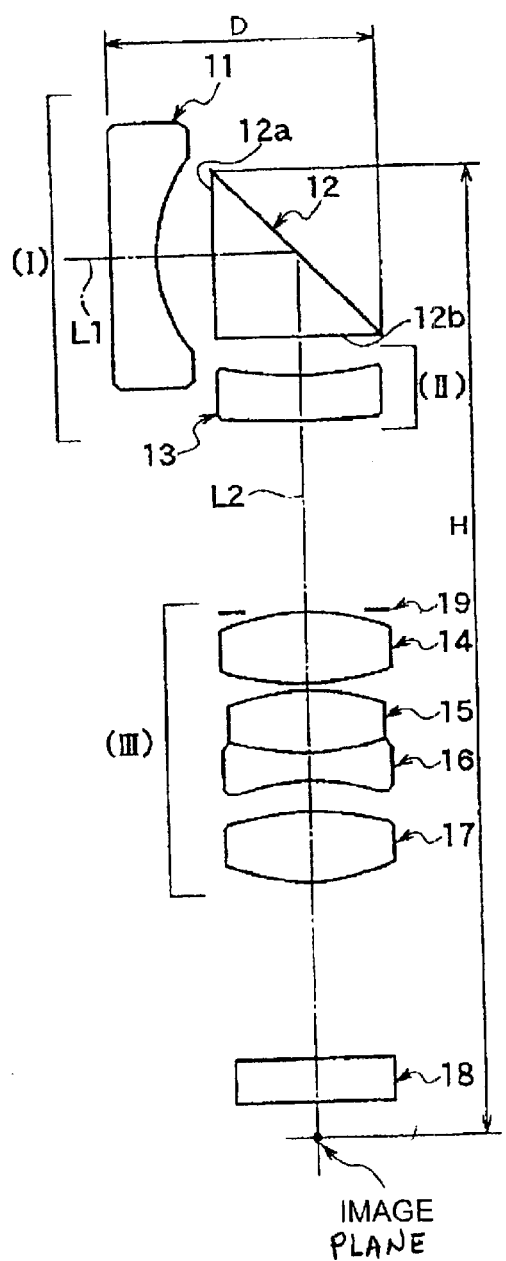
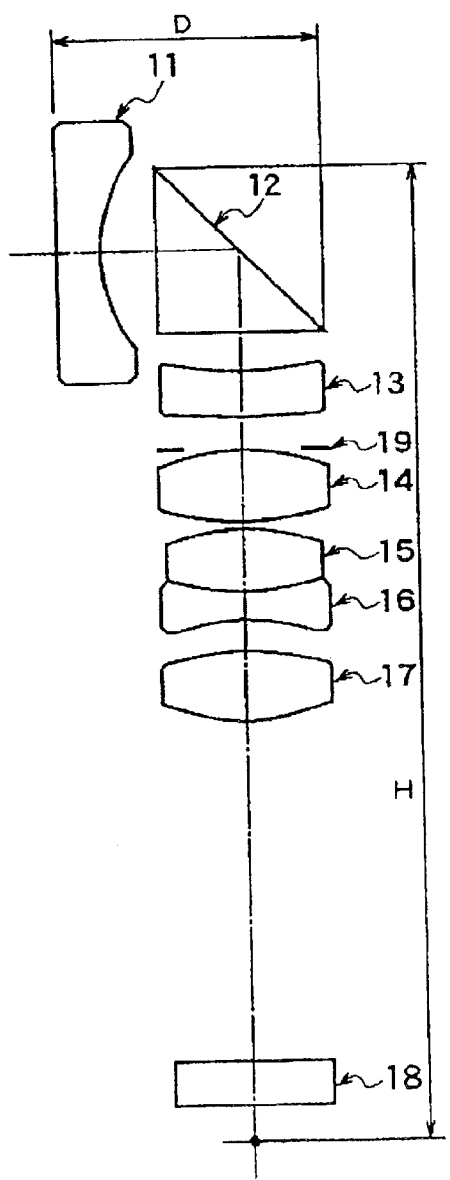
IMAGE PLANE

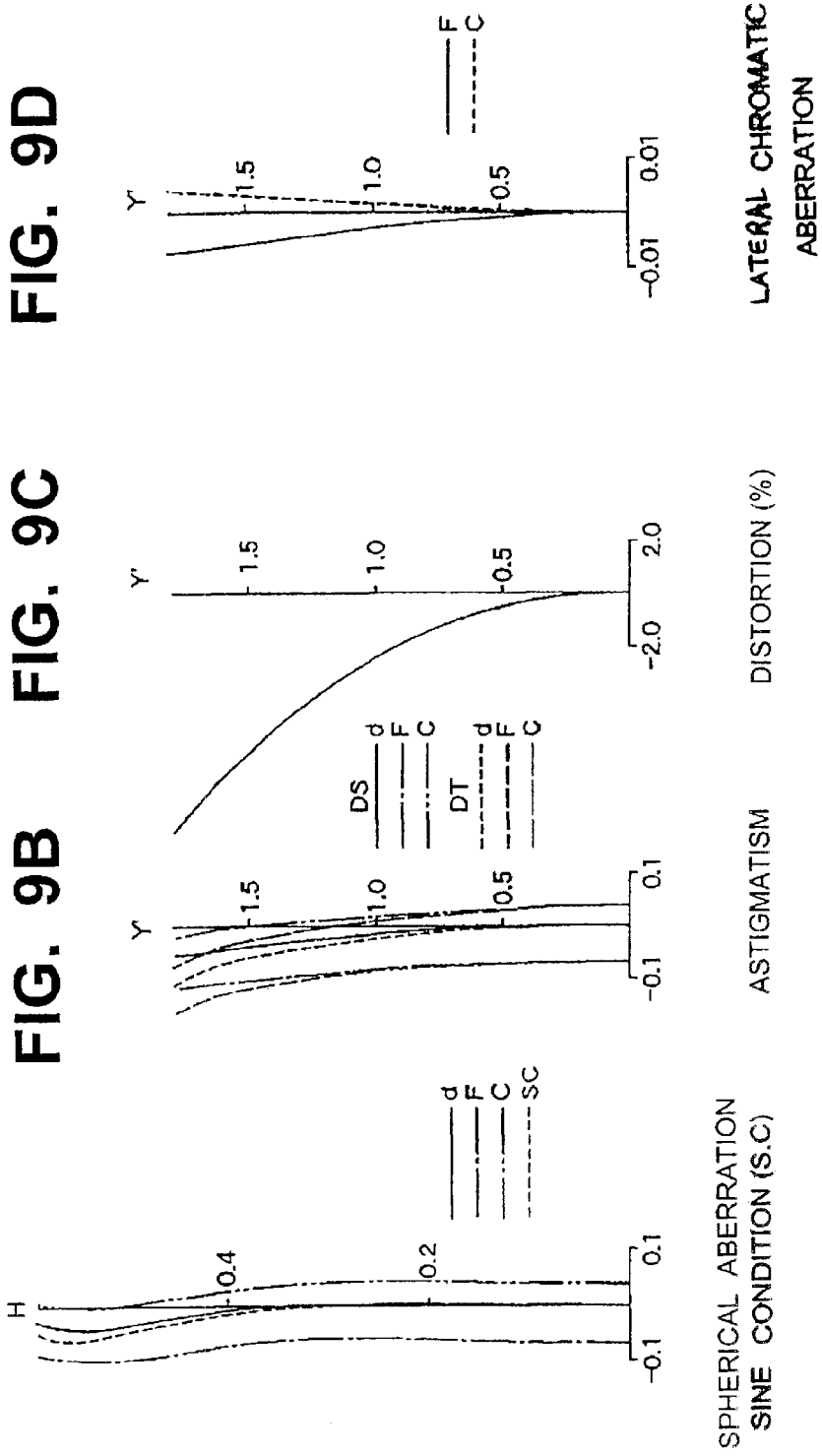

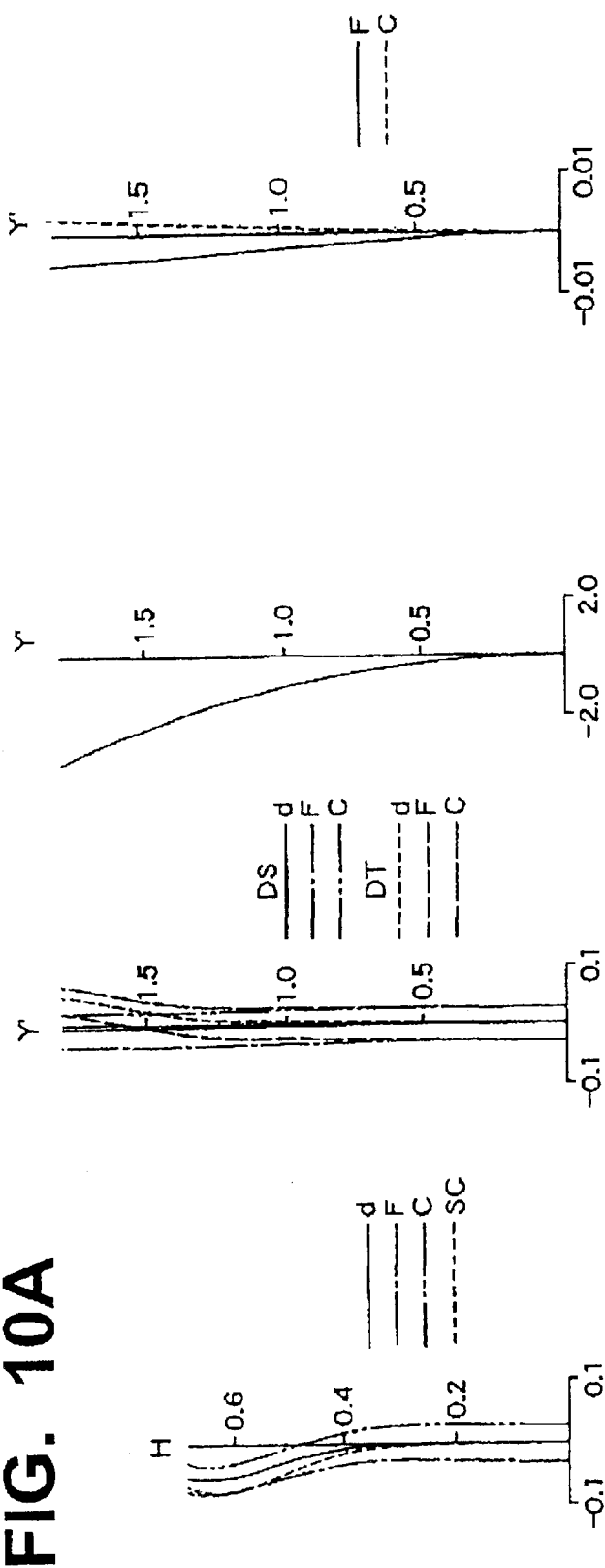

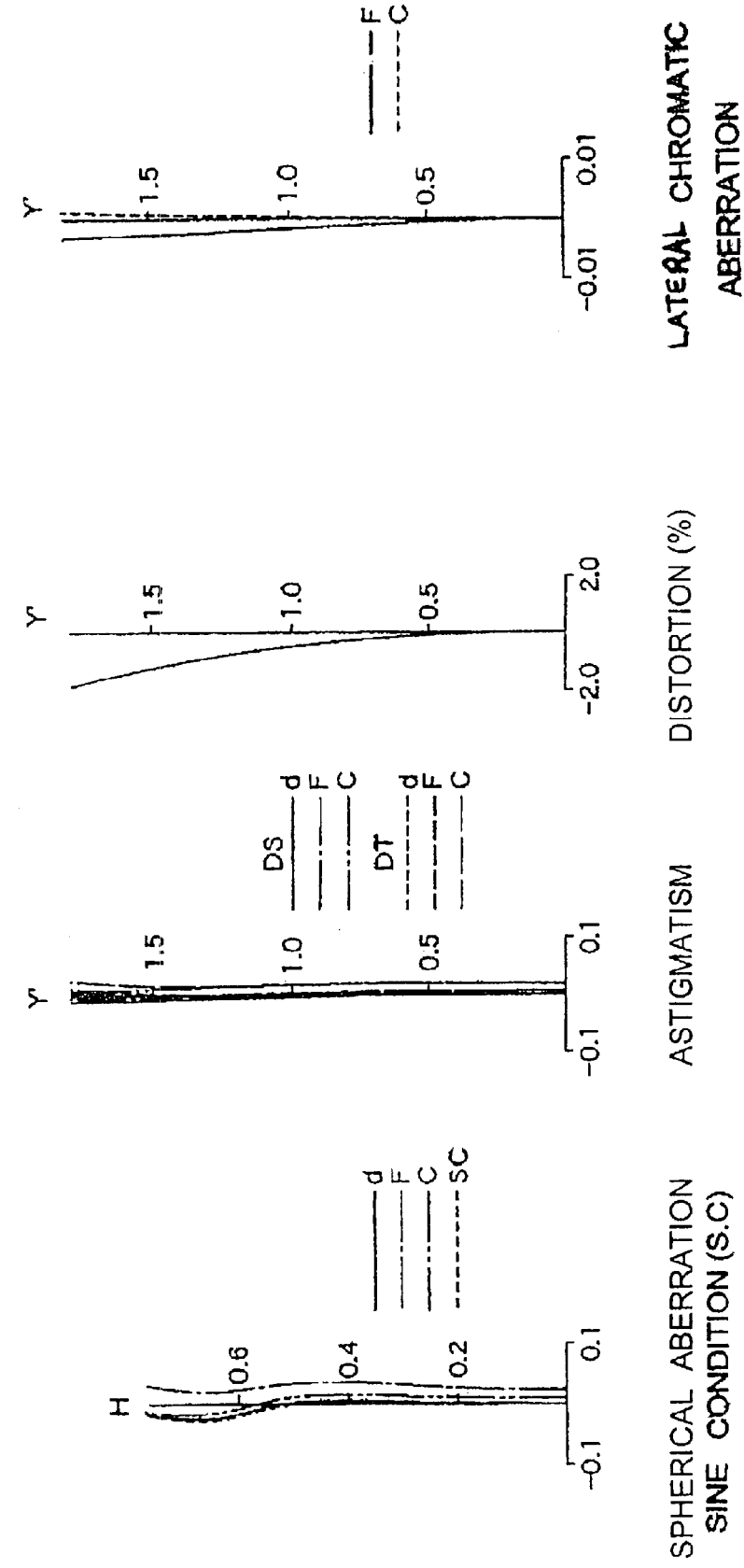

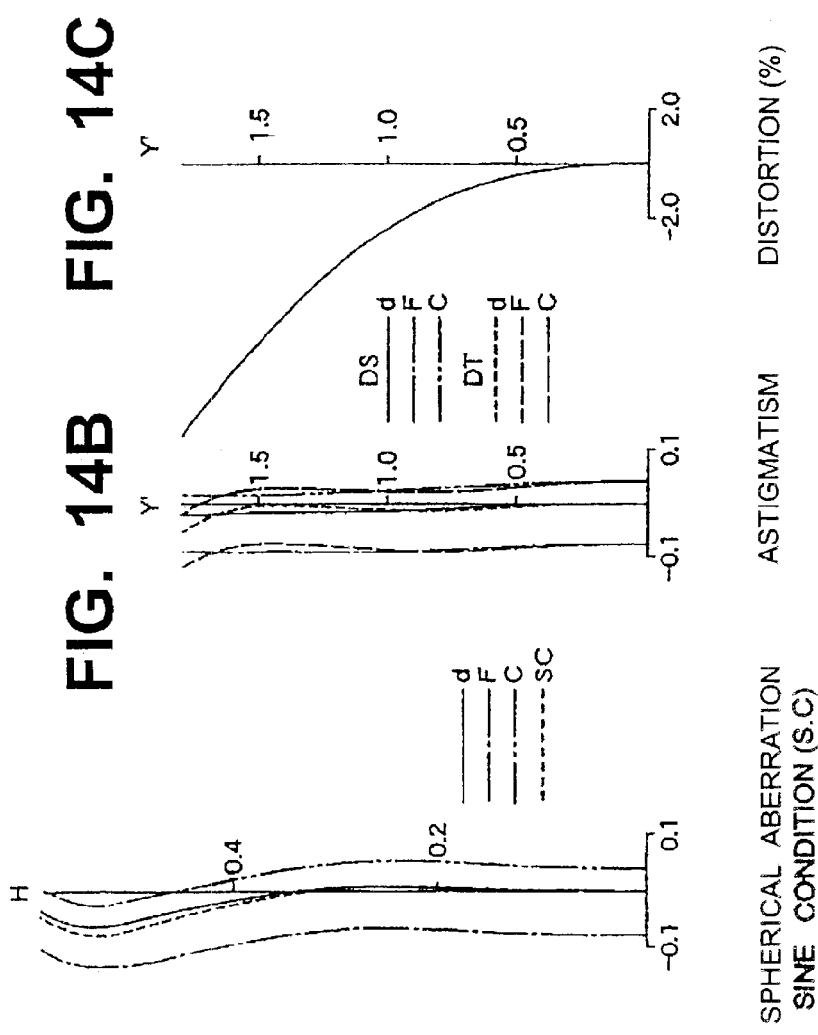

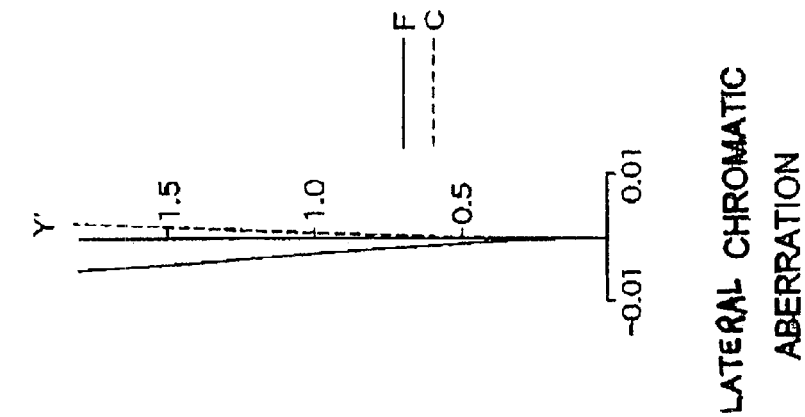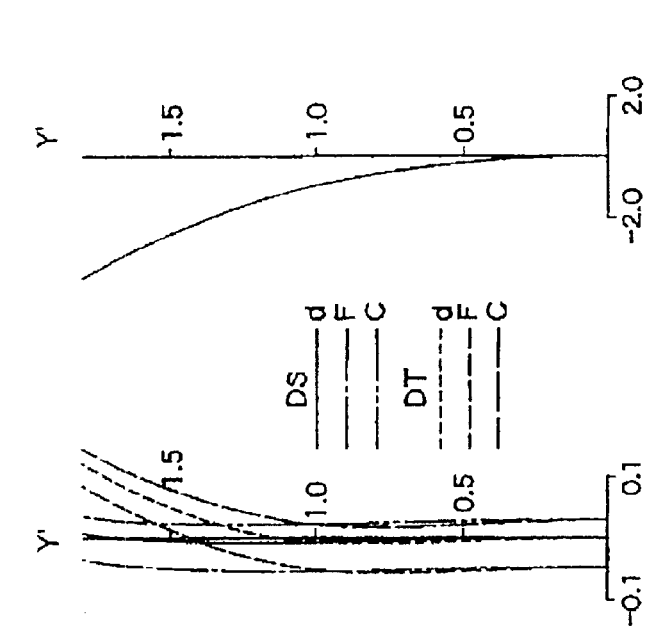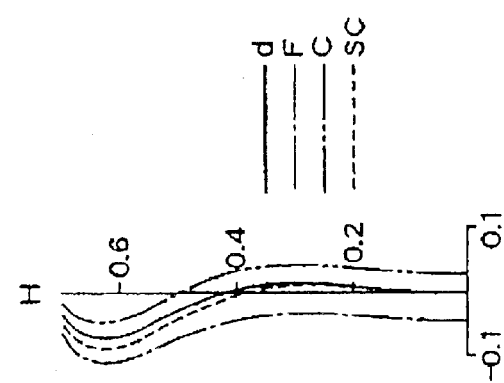

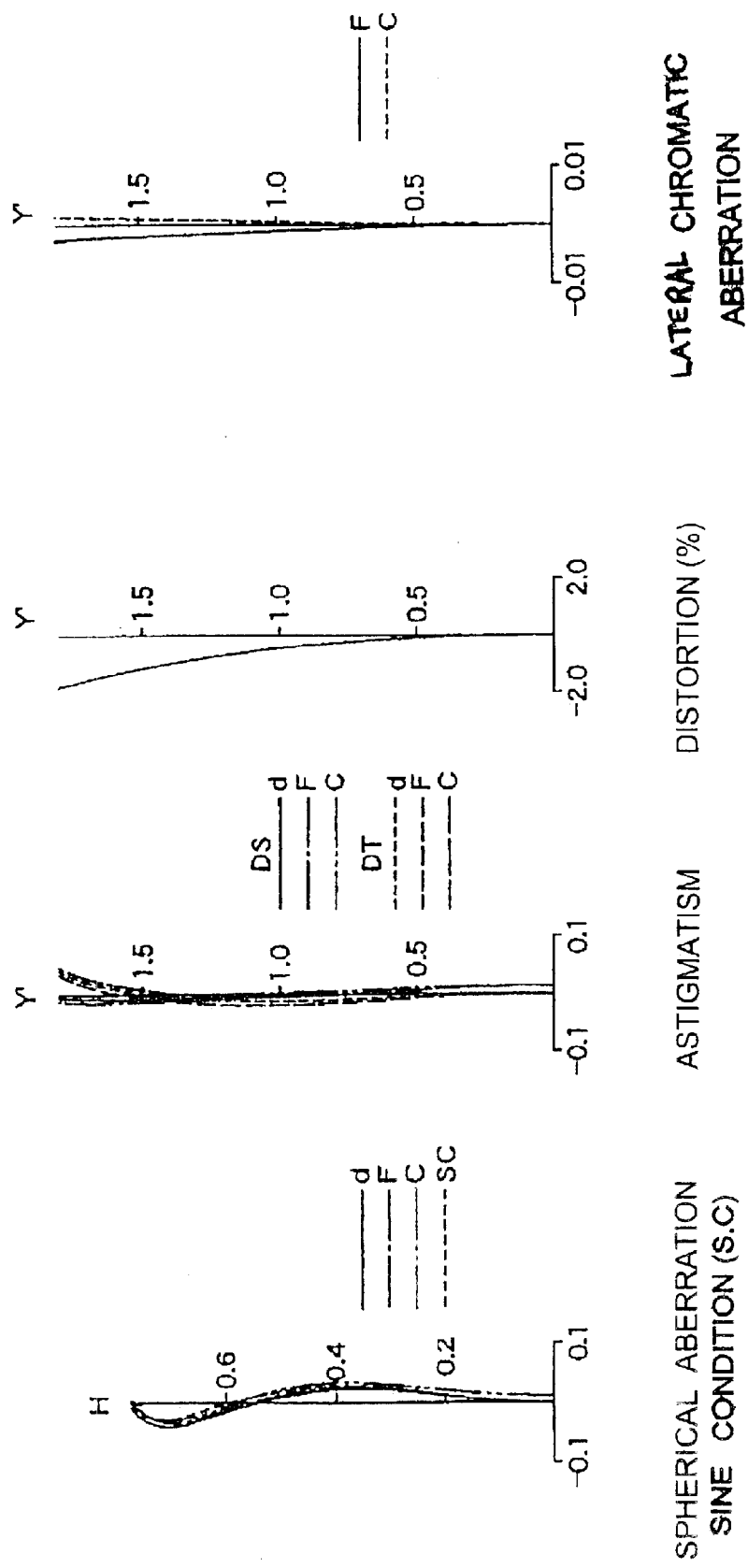

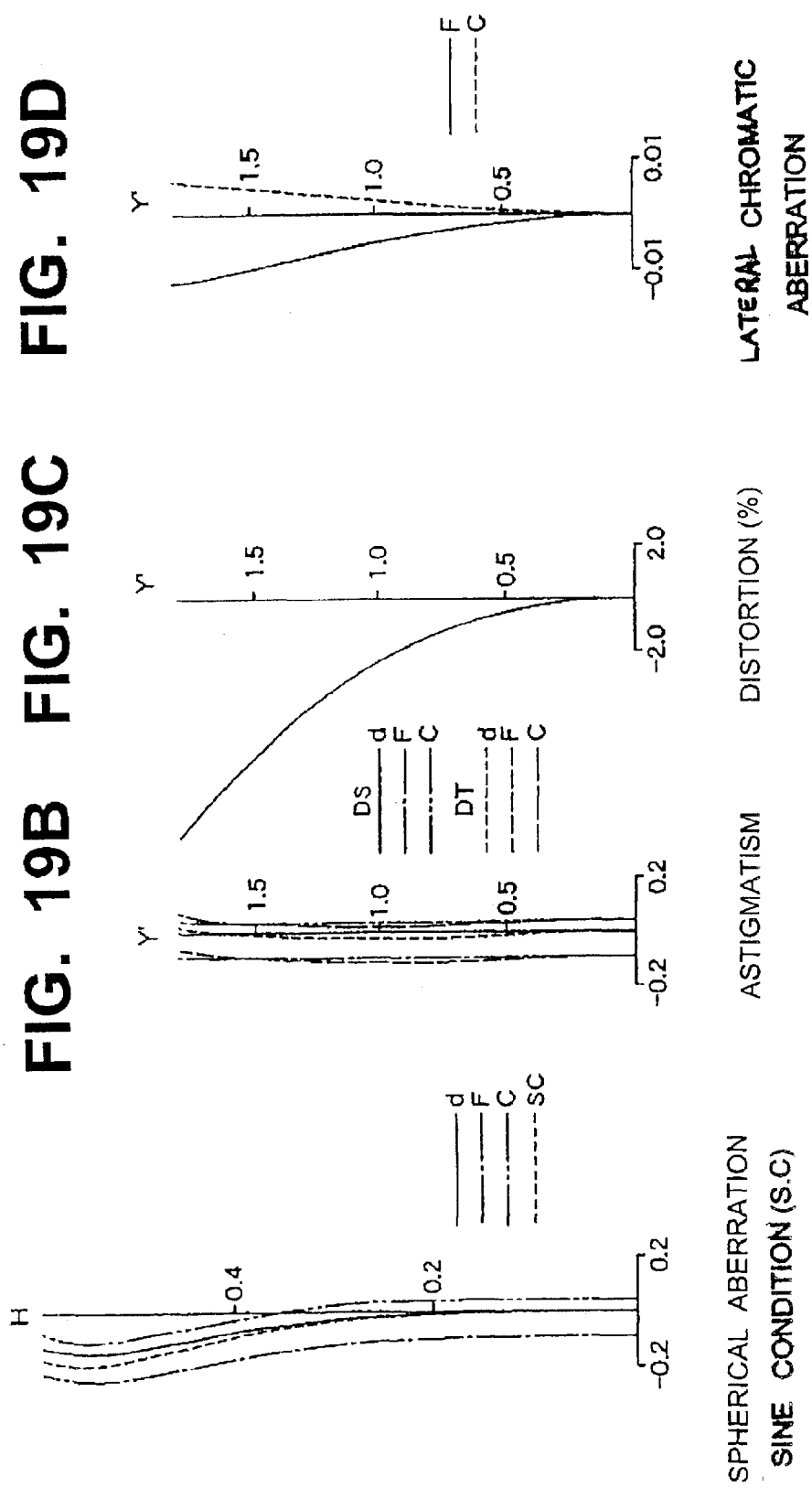

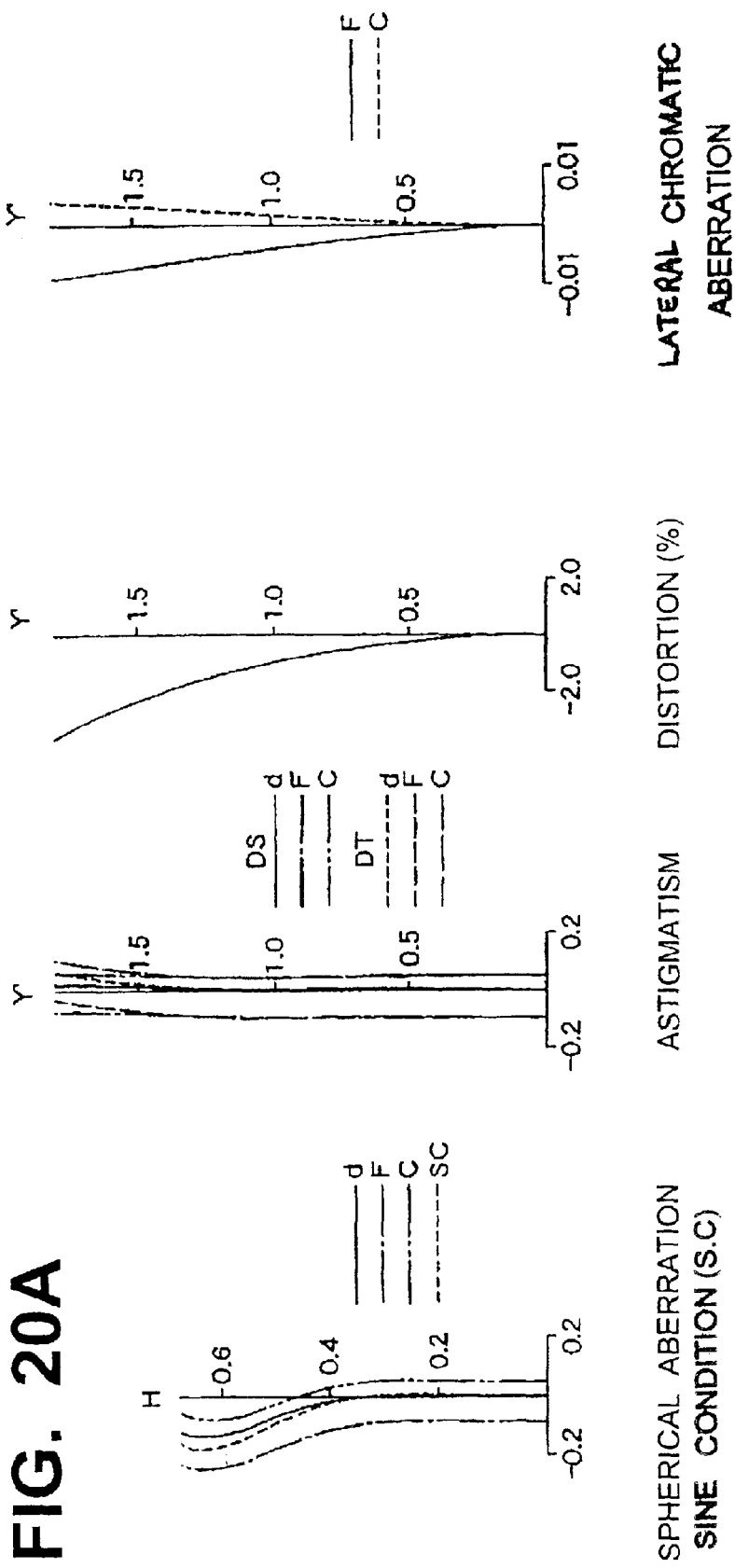

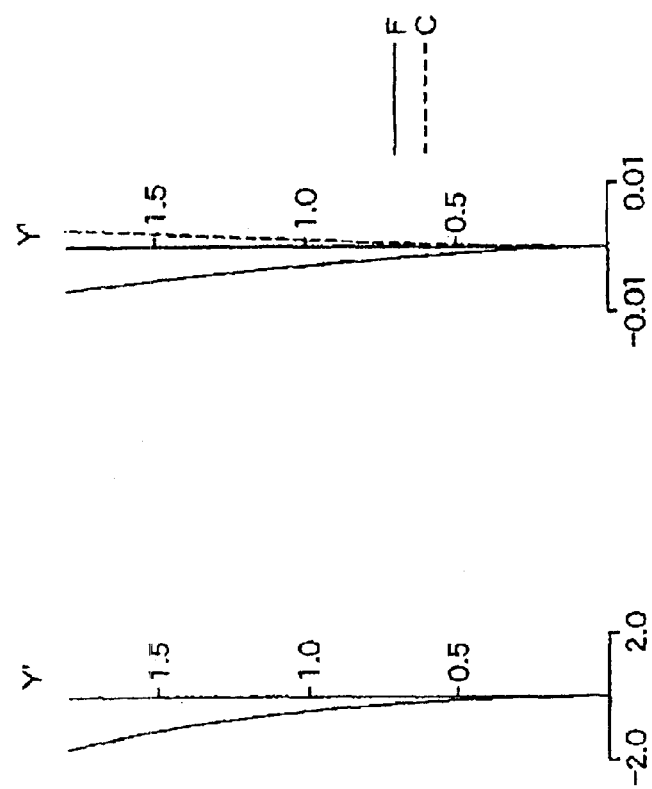

ZOOM LENS

FIELD OF THE INVENTION

The present invention relates to a zoom lens suitable for small digital still cameras, video cameras and the like equipped with image pickup devices such as CCD and the like, in particular, a zoom lens suitable for small digital still cameras, video cameras and the like built into cellular telephones, portable information terminals (PDA), etc.

BACKGROUND ART

In recent years, due to remarkable technical advancements in solid state image pickup devices for uses in digital still cameras, video cameras and the like, small charge-coupled devices ("CCD") and similar devices are developed and, with it, a demand of smaller and lighter optical systems are in great demand.

In particular, there is a need for smaller and thinner optical systems to be used on cellular telephones and portable information terminals as they become smaller and thinner. The optical systems used on the cellular telephones and portable information terminals of the prior art have been relatively small and suitable for demands for smaller and thinner units because they were fixed focal point lens systems.

In order to have a zoom lens that provides variable magnifying power on a cellular telephone and a portable information terminal where a smaller and thinner unit is mandatory, it is necessary to have a plurality of lens barrels that are arranged to be able to slide in and out and cause them to collapse into the body when it is not in use in order to make the system thinner. The embodiment of the lens barrels, including the collapsible mount mechanism, becomes more complex as the number of components increases.

In order to improve the above situation, the present invention intends to provide a small, thin, and light zoom lens having a high quality optical capability suitable for being used on cellular telephones and portable information terminals, more specifically, a zoom lens having a zoom ratio of about 2, a depth direction stroke in the incidence direction of the object light between the in-use and the not-in-use (stored) conditions of less than 9 mm, and the longest dimension when it is in-use of less than 30 mm.

SUMMARY OF THE INVENTION

The zoom lens of the present invention comprises: a first lens group having a negative refractive power as a whole, a second lens group having a negative refractive power as a whole, and a third lens group having a positive refractive power as a whole, arranged in said order from object side to image plane side, for zooming from a wide-angle end to a telephoto end by means of moving said third lens group from image plane side to objection side as well as correcting image plane changes required, in accordance with said zooming by means of moving said second lens group; wherein said first lens group consists of a lens having a negative refractive power and a prism for changing a light path arranged in said order from the object side.

Since the depth dimension of the zoom lens according to said embodiment is the depth, dimension in the direction the object light enters into the first lens group (a lens and a prism), it is possible to obtain a thin and small zoom lens wherein the depth dimension and the dimension between the first lens group to the image plane remain constant regardless of whether it is used or not for shooting.

In the above embodiment, it is possible to adopt such an embodiment wherein the second lens group consists of a lens with a negative refractive power and an aperture stop exists between the second lens group and the third lens group. In this embodiment, the total length in the optical axis direction becomes shorter and the lens groups on both sides (located on the upstream side and the downstream side) of the aperture stop can be formed in such a way as to have approximately identical external dimensions, so that the zoom lens can be made more compact efficiently.

In the above embodiment, it is possible to adopt such an embodiment wherein the lens of the first lens group has an aspherical surface, the aspherical surface is formed on the surface with a smaller curvature radius, and the negative aspherical surface has a negative refractive power weakening toward its periphery. According to these embodiments, a better optical characteristic can be achieved as various aberrations can be easily corrected by having an aspherical surface, and distortion can be more easily corrected by having the aspherical surface on the surface with a smaller curvature radius and forming it in such a way as to make the refractive power weaken toward the periphery.

In the above embodiment, said third lens group can be constituted to have at least one lens with a positive refractive power and at least one lens with a negative refractive power. According to said embodiment, various aberrations can be corrected with a better balance.

In the above embodiment, said third lens group can be constituted to have a lens at a position closest to the object having a positive refractive power and an aspheric surface at least on one side. According to said embodiment, spherical aberration can be corrected most suitably.

In the above embodiment, the prism of said first lens group can be formed to have an entrance surface and an exit surface both oblong in a direction perpendicular to a plane that includes an entrance axis and an exit axis. According to this embodiment, the zoom lens can be made thinner in the direction the object light enters (the direction of the optical axis from the first group's lens to the prism).

In the above embodiment, it is possible to adopt an embodiment that satisfies the following conditional formulas (1) and (2):

$$0.25 < |fw/f1| < 0.7 \quad (1)$$

$$v1 > 40 \quad (2)$$

where f1 is the focal length of the first lens group, fw is the focal length of the total lens system at the wide-angle end, and v1 is the Abbe number of the first lens group's lens. According to this embodiment, if the value of $|fw/f1|$ in the conditional formula (1) exceeds its lower limit, the refractive power of the lens of the first lens group becomes too small, so that a necessary back focus cannot be achieved; on the other hand, if it exceeds the upper limit, the back focus becomes too large, so that it becomes difficult to make the unit smaller as well as to correct astigmatism and coma aberrations. Therefore, by satisfying the conditional formula (1), a better optical characteristic and size reduction can be achieved. Also, by satisfying the conditional formula (2), lateral chromatic aberration can be corrected appropriately.

In the above embodiment, it is possible to adopt an embodiment that satisfies the following conditional formulas (3):

$$0.1 < f3/|f2| < 0.8 \quad (3)$$

where f2 is the focal length of the second lens group, and f3 is the focal length of the third lens group. According to this embodiment, if the value of f3/|f2| in the conditional formula (3) exceeds the lower limit, it becomes difficult to achieve a zoom ratio of approximately 2; on the other hand, if it exceeds the upper limit, the back focus becomes too large and the most outward entrance axis moves away from the optical axis at the wide-angle end, so that the first lens group's lens becomes too large and makes it impossible to reduce the unit's size. Therefore, by satisfying the conditional formula (3), a zoom ratio of approximately 2, a better optical characteristic and size reduction can be achieved.

BRIEF DESCRIPTION OF THE DRAWINGS

FIG. 3 is a perspective view of the zoom lens shown in FIG. 1.

FIGS. 8 (a) and (b) show the side views of the zoom lens shown in FIG. 7 at its wide-angle end and telephoto end.

FIGS. 9 (a), (b), (c), and (d) show aberration charts of spherical aberration, astigmatization, distortion, and lateral chromatic aberration at the pantographic end of the zoom lens according to the embodiment of FIG. 7.

FIGS. 10 (a), (b), (c), and (d) show aberration charts of spherical aberration, astigmatization, distortion, and lateral chromatic aberration at a middle position of the zoom lens according to the embodiment of FIG. 7.

FIGS. 11(a), (b), (c), and (d) show aberration charts of spherical aberration, astigmatization, distortion, and lateral chromatic aberration at a telephoto end of the zoom lens according to the embodiment of FIG. 7.

FIGS. 14(a), (b), (c), and (d) show aberration charts of spherical aberration, astigmatization, distortion, and lateral chromatic aberration at the pantographic end of the zoom lens according to the embodiment of FIG. 12.

FIGS. 15(a), (b), (c), and (d) show aberration charts of spherical aberration, astigmatization, distortion, and lateral chromatic aberration at a middle position of the zoom lens according to the embodiment of FIG. 12.

FIGS. 16(a), (b), (c), and (d) show aberration charts of spherical aberration, astigmatization, distortion, and lateral chromatic aberration at a telephoto end of the zoom lens according to the embodiment of FIG. 12.

FIGS. 19(a), (b), (c), and (d) show aberration charts of spherical aberration, astigmatization, distortion, and lateral chromatic aberration at the wide-angle end of the zoom lens according to the embodiment of FIG. 17.

FIGS. 20(a), (b), (c), and (d) show aberration charts of spherical aberration, astigmatization, distortion, and lateral chromatic aberration at a middle position of the zoom lens according to the embodiment of FIG. 17.

FIGS. 21(a), (b), (c), (d) show aberration charts of spherical aberration, astigmatization, distortion, and lateral chromatic aberration at a telephoto end of the zoom lens according to the embodiment of FIG. 17.

DESCRIPTION OF NUMERICAL KEYS USED IN THE DRAWINGS

Figure 1:
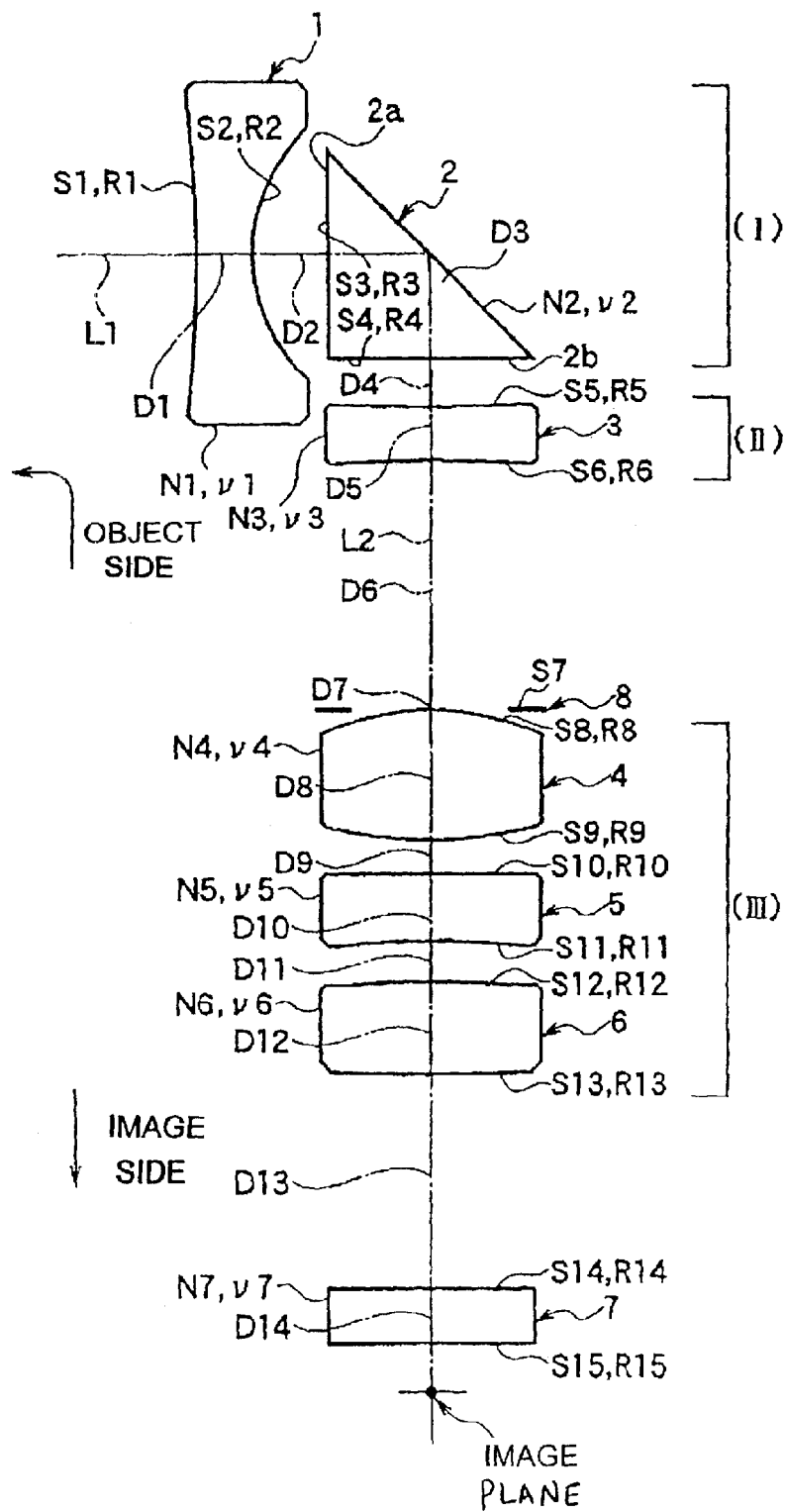
FIG. 1 is a drawing showing an embodiment of a zoom lens according to the present invention.

I First lens group
II Second lens group
III Third lens group
1, 11, 11" Lens (first lens group)
2, 12, 12" Prism (first lens group)
2a, 12a Entrance surface
2b, 12b Exit surface
L1 Entrance axis
L2 Exit axis
3. 13, 13" Lens (second lens group)
4, 14, 14', 14" Lens (third lens group)
5, 15, 15" Lens (third lens group)
6, 16, 16', 16" Lens (third lens group)
7, 18 Glass filter
8, 19 Aperture stop
17, 17', 17" Lens (third lens group)
D1–D16 Surface distance on optical axis
R1–R6, R8–R17 Curvature radius
S1–S17 Surface
Preferred Embodiment A preferred embodiment of the present invention is described below referring to the accompanying drawings.

Figure 2A:
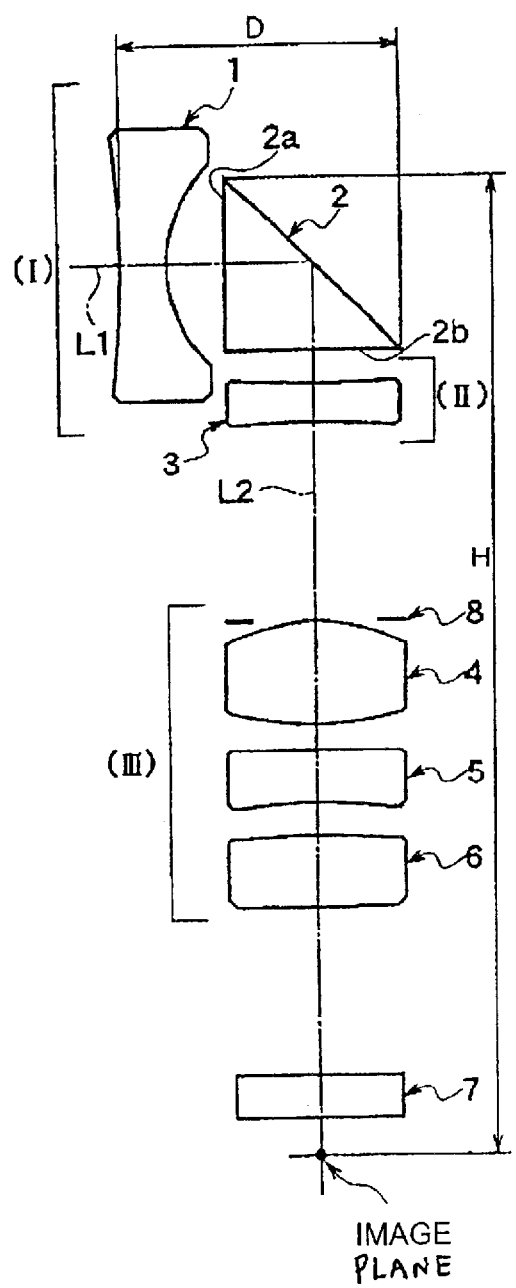
FIGS. 2(a) and (b) show the side views of the zoom lens shown in FIG. 1 at its wide-angle end and telephoto end.

FIG. 1 through FIG. 3 show an embodiment of a zoom lens according to the present invention, wherein FIG. 1 shows its basic embodiment, FIGS. 2(a) and (b) show a view of the positional relations at the wide-angle and at the telephoto end, and FIG. 3 is a perspective view of the embodiment.

In this zoom lens, a first lens group (I) that has a negative refractive power as a whole, a second lens group (II) that has a negative refractive power as a whole and a third lens group (III) that has a positive refractive power as a whole are laid out in that order from the object side to the image side.

The first lens group (I) consists of a lens 1 that has a negative refractive power and a prism 2 that changes the light path. The second lens group (II) consists of a lens 3 that has a negative refractive power. The third lens group (III) consists of a lens 4 that has a positive refractive power, a lens 5 that has a negative refractive power, and a lens 6 that has a positive refractive power.

The lenses and the prisms that constitute the first lens group (I), the second lens group (II), and the third lens group (III) are all made of resin materials. As they are made of resin materials, they are light and inexpensive.

In the above embodiment, a glass filter 7 such as an infrared cut filter or a low pass filter is provided on the image plane side relative to lens 6 of the third lens group (III), and an aperture stop 8 is provided between the second lens group (II) and the third lens group (III), i.e., between lens 3 and lens 4. Since aperture 8 is located in the position as mentioned above, it is possible to make the lens groups arrange on both sides of it to have approximately equal outer diameters, thus reducing the size as a whole.

Figure 2B:
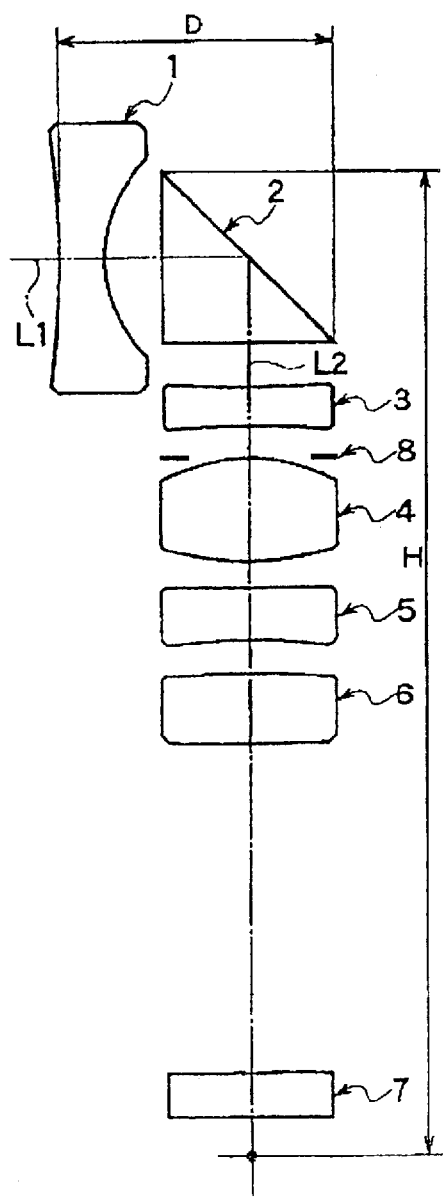
Figure 4A:
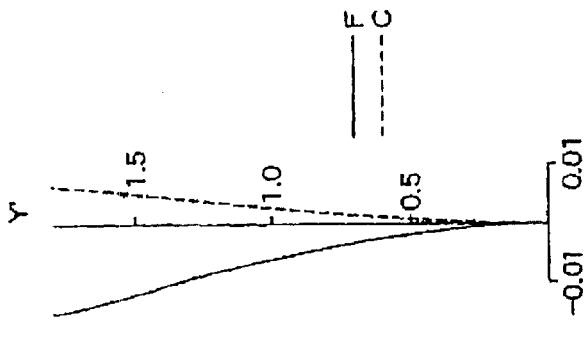
FIGS. 4(a), (b), (c), and (d) show aberration charts of spherical aberration, astigmatization, distortion, and lateral chromatic aberration at the wide-angle end of the zoom lens according to the embodiment of FIG. 1.
Figures 4B, 4C:
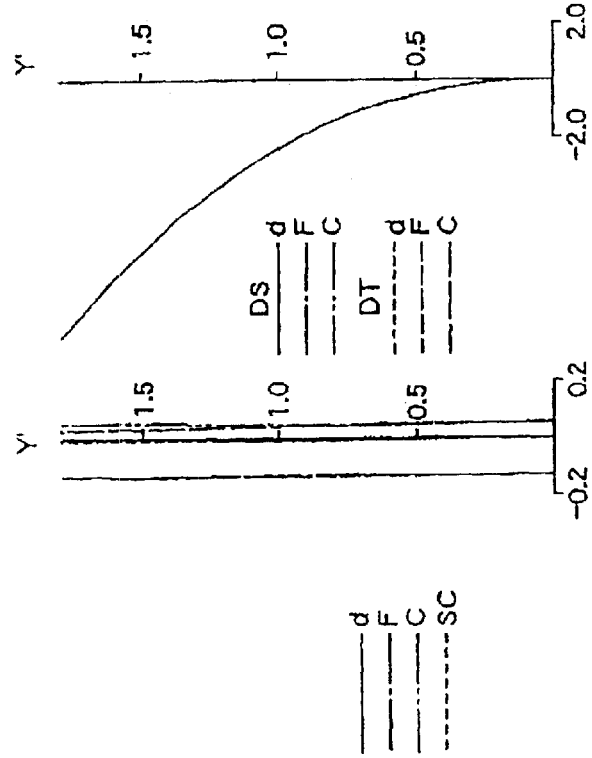
Figure 4D:
Figures 5A, 5B, 5C, 5D:
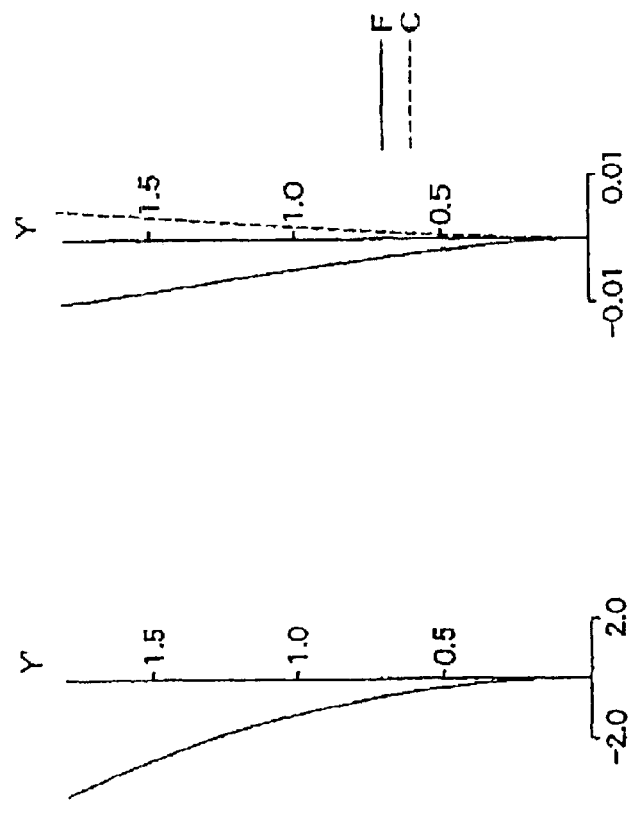
FIGS. 5(a), (b), (c), and (d) show aberration charts of spherical aberration, astigmatization, distortion, and lateral chromatic aberration at a middle position of the zoom lens according to the embodiment of FIG. 1.
Figure 6A:
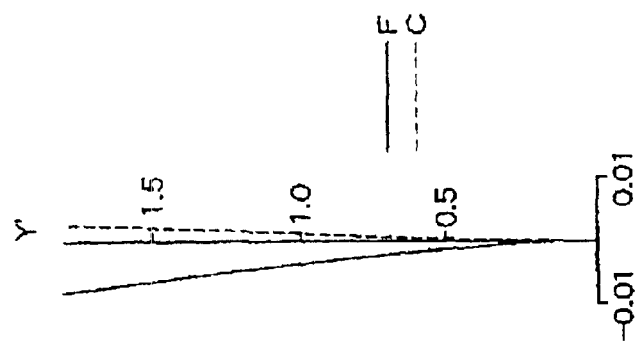
FIGS. 6(a), (b), (c), and (d) show aberration charts of spherical aberration, astigmatization, distortion, and lateral chromatic aberration at a telephoto end of the zoom lens according to the embodiment of FIG. 1.
Figure 6B:
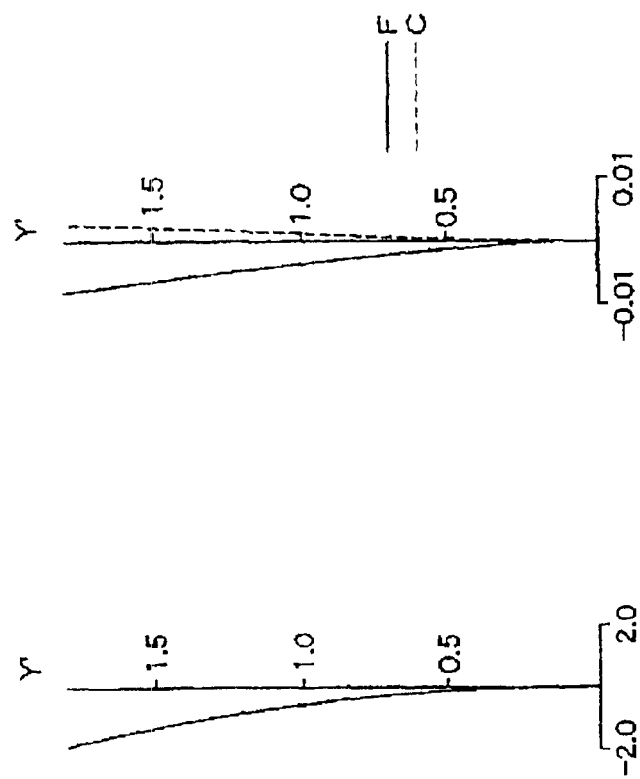
Figure 6C:
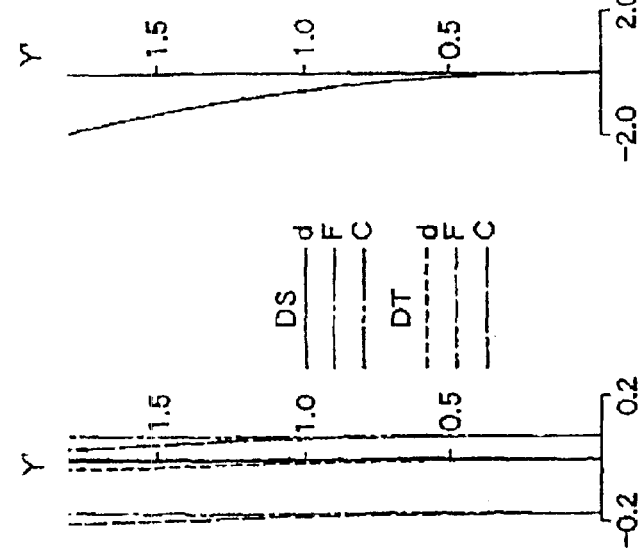
Figure 6D:
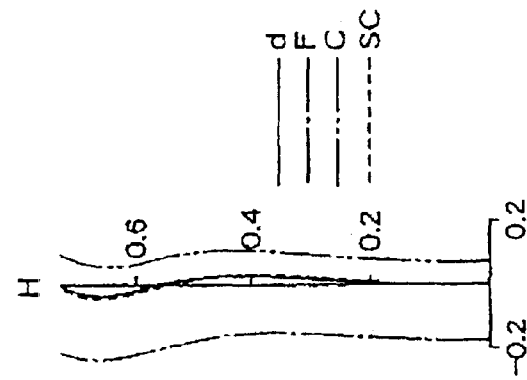

In the above embodiment, the third lens group (III) moves from the image plane side to the object side, in other words, from the wide-angle end shown in FIG. 2(a) to the telephoto end as shown in FIG. 2(b) to perform the zooming operation while the second lens group (II) moves to correct the image plane change caused by the zooming operation. Since the depth dimension D of the lens and the lateral total length H of the lens (distance from prism 2 of the first lens group (I) to the image surface) are unchanged during the zooming operation, it can be easily mounted on cellular telephones, portable information terminals and the like where the mounting spaces are limited.

The focal length of the first lens group (I) is denoted f1, the focal length of the second lens group (II) is f2, the focal length of the third lens group (III) is f3, the focal length of the total lens system at the wide-angle end is fw, the focal length of the total lens system at the telephoto end is ft, and the focal length of the total lens system in the middle range is fm.

The surfaces of lens 1, prism 2, and lens 3 through lens 6 are denoted Si (i=1–6, 8–13), the curvature radius of each surface Si is Ri (i=1–6, 8–13), the refractive ratio relative to line "d" is Ni, and the Abbe number is vi (i=1–6) as shown in FIG. 1.

As to glass filter 7, its surfaces are denoted Si (i=14, 15), the curvature radius of surface Si is Ri (i=14, 15), the refractive ratio relative to line "d" is N7, and the Abbe number is v7. Further, each space (thickness, air gap) located between lens 1 and glass filter 7 along the optical axis is denoted Di (i=1–14).

In prism 2, its entrance surface 2a and exit surface 2b are formed in rectangular shapes that are oblong in a direction perpendicular to a plane that contains entrance axis L1 and exit axis L2. In this case, the direction of the longer side of prism 2 and the direction of the longer side of image pickup device (image surface) coincide with each other. As a result, the depth dimension D in the entrance axis L1 direction of the first lens group (I), i.e., the zoom lens, can be reduced, thus making the unit thinner.

A surface S2 with a smaller curvature radius between a surface S1 of the object side of lens 1 and surface S2 of image plane side is formed as an aspherical surface, wherein this aspherical surface is formed in such a way that its negative refractive power weakens toward the periphery. As a result, corrections of various aberrations, in particular, correction of distortion, can be achieved.

A surface S8 on the object side of lens 4, a surface S11 on the image plane side, of lens 5, and a surface S12 on the object side of lens 6 are formed as aspherical surfaces. Consequently, various aberrations can be adjusted in a good balance, and spherical aberrations can be corrected suitably, especially by forming surface S8 as an aspherical surface.

An aspherical surface can be expressed in the following formula:

$$Z=Cy^2/[1+(1-\epsilon C^2Y^2)^{1/2}]+Dy^4+Ey^6+Fy^8+Gy^{10},$$

wherein Z is the distance from the vertex of the aspherical surface to a point on the aspherical surface whose height from the optical axis X is y; y is the height from the optical axis; C is the ratio of curvature (1/R) at the vertex of the aspherical surface; $\epsilon$ is the conical constant, and D, E, F, and G are aspherical coefficients.

In the above embodiment, the first lens group (I) is formed to satisfy the following two formulas:

$$0.25<|fw/f1|<0.7, \text{ and} \quad (1)$$

$$v1>40, \quad (2)$$

where f1 is the focal length of the first lens group, fw is the focal length of the total lens system at the wide-angle end, and v1 is the Abbe number of the lens of the first lens group (I).

The conditional formula (1) defines the ratio of an appropriate focal length for the first lens group (I), where if the ratio exceeds the upper limit, the back focus becomes too large, so that it becomes difficult to make the unit smaller as well as to correct astigmatism and coma aberrations; on the other hand if it exceeds its lower limit, the refractive power of lens 1 becomes too small, so that it becomes difficult to secure a necessary back focus. In other words, it is possible to achieve a satisfactory, optical capability and reduce the size of the unit by satisfying this conditional formula (I).

The conditional formula (2) defines the Abbe number of lens 1 that constitutes the first lens group (I), where if Abbe number is less than the lower limit it becomes difficult to correct the lateral chromatic aberration. In other words, by satisfying the conditional formula (2), lateral chromatic aberration can be corrected appropriately.

Also, in the above embodiment, the second lens group (II) and the third tens group (III) are constituted to satisfy the following formula:

$$0.1<f3/|f2|<0.8 \quad (3)$$

(where f2 denotes the focal length of the second lens group, and f3 denotes the focal length of the third lens group.)

This conditional formula (3) defines an appropriate ratio between the focal lengths of the second lens group (II) and the third lens group (III), where if it exceeds its lower limit, it becomes difficult to achieve a zoom ratio of approximately 2; on the other hand, if the ratio exceeds the upper limit, the back focus becomes too larger the outermost entrance axis moves away from the optical axis at the wide-angle end and makes the lens of the first group too large, so that it becomes difficult to make the unit smaller. Therefore, by satisfying the conditional formula (3), a zoom ratio of approximately 2, a better optical characteristic and size reduction can be achieved.

As an example using specific numerical values of the above embodiment, an embodiment 1 will be shown below. Table 1 shows the major dimensions of embodiment 1, Table 2 shows various numerical data (setup values), Table 3 shows numerical values of the aspheric surfaces, and Table 4 shows the focal length of the entire lens "f" (fw at the wide-angle end, fm at the middle position, and ft at the telephoto end) as well as numerical data concerning the spacing between the surfaces on the axis D4, D6 and D13 at the wide-angle end, middle position, and telephoto end specifically. In this example, the numerical data of the conditional formulas (1), (2) and (3) are: |fw/f1|=0.556 (fw=3.350 mm, f1=−6.023 mm), v1=56.4, and f3/|f2|=0.158 (f2=−43.986 mm, f3=6.935 mm).

FIGS. 4a–4d, FIGS. 5a–5d and FIGS. 6a–6d are the aberration charts of spherical aberration, astigmatic aberration, distortion, and lateral chromatic aberration at the wide-angle end, middle position, and telephoto end respectively. In FIG. 4 through FIG. 6, FIG. 9 through FIG. 11, FIG. 14 through FIG. 16 and FIGS. 19 through 21, "d" denotes the aberration due to "d" line, "F" denotes the aberration due to "F" line, and "c" denotes the aberration due to "c" line, while SC denotes the amount of dissatisfaction of the sine condition, DS denotes the aberration on the sagittal plane, and DT denotes the aberration of the meridional plane.

TABLE 1

| Object distance (mm) | Infinity (∞) | Total lateral length (prism to image plane) mm | 27.70 |
|---|---|---|---|
| Focal length (mm) | 3.35~4.75~6.43 | Back focus (air conversion) (mm) | 6.45~8.75~11.03 |
| F number | 2.89~3.60~4.39 | Angle of view (2ω) | 61.3°~43.1°~31.9° |
| Total lens length (front of lens 1 to image surface) (mm) | 30.65 | Focal length f1 (mm) | −6.023 |
| Thickness of first lens group (depth) (mm) | 7.65 | Wide-angle end focal length fw (mm) | 3.350 |
| Thickness of second lens group (mm) | 1.25 | Focal length f2 (mm) | −43.986 |
| Thickness of third lens group (mm) | 8.20 | Focal length f3 (mm) | 6.935 |

TABLE 2

| Surface | Curvature radius (mm) | Distance (mm) | Refractive index ("d" line) | Abbe number |
|---|---|---|---|---|
| S1 | R1 −32.751 | D1 1.250 | N1 1.50914 | ν1 56.4 |
| S2* | R2 3.427 | | | |
| | | D2 1.700 | | |
| S3 | R3 ∞ | D3 4.700 | N2 1.58385 | ν2 30.3 |
| S4 | R4 ∞ | | | |
| | | D4 variable | | |
| S5 | R5 −45.000 | D5 1.250 | N3 1.50914 | ν3 56.4 |
| S6 | R6 45.000 | | | |
| | | D6 variable | | |
| S7 | Aperture stop | | | |
| | | D7 0.000 | | |
| S8* | R8 4.800 | D8 3.000 | N4 1.50914 | ν4 56.4 |
| S9 | R9 −8.084 | | | |
| | | D9 0.800 | | |
| S10 | R10 −39.076 | D10 1.500 | N5 1.58385 | ν5 30.3 |
| S11* | R11 20.910 | | | |
| | | D11 0.900 | | |
| S12* | R12 18.039 | D12 2.000 | N6 1.50914 | ν6 56.4 |
| S13 | R13 −73.116 | | | |
| | | D13 variable | | |
| S14 | R14 ∞ | D14 1.200 | N7 1.51680 | ν7 64.2 |
| S15 | R15 ∞ | | | |

*Aspheric

TABLE 3

| Aspheric coefficient | | Numerical data |
|---|---|---|
| S2 surface | ε | 0.5130000 |
| | D | −0.6882592 × 10⁻³ |
| | E | 0.6217665 × 10⁻⁵ |
| | F | 0.1615279 × 10⁻⁵ |
| | G | −0.3138584 × 10⁻⁶ |
| S8 surface | ε | −1.0000000 |
| | D | 0.5790936 × 10⁻³ |
| | E | 0.5066817 × 10⁻⁴ |
| | F | −0.8724338 × 10⁻⁵ |
| | G | −0.1568151 × 10⁻⁵ |
| S11 surface | ε | −15.6000000 |
| | D | 0.1230093 × 10⁻³ |
| | E | −0.1160219 × 10⁻³ |
| | F | −0.1716015 × 10⁻⁴ |
| | G | −0.9113209 × 10⁻⁶ |

TABLE 3-continued

| Aspheric coefficient | | Numerical data |
|---|---|---|
| S12 surface | ε | −27.0000000 |
| | D | −0.1450770 × 10⁻² |
| | E | −0.2387584 × 10⁻³ |
| | F | −0.1219637 × 10⁻⁴ |
| | G | −0.4467548 × 10⁻⁶ |

TABLE 4

| | Wide-angle end | Middle position | Telephoto end |
|---|---|---|---|
| f (mm) | 3.35 (fw) | 4.75 (fm) | 6.43 (ft) |
| D4 (mm) | 1.000 | 2.982 | 1.318 |
| D6 (mm) | 5.700 | 1.413 | 0.800 |
| D13 (mm) | 4.655 | 6.960 | 9.237 |

(Back focus 1.00 mm)

In the above embodiment 1, lens depth D (lens 1 to prism 2) is 7.65 mm, total lateral lens length (prism 2 to image surface) H when it is in use is 27.70 mm, total lens length (front S1 of lens 1 to image surface) is 30.65 mm, back focus (air equivalent) is 6.45 mm–11.03 mm, F number is 2.89–4.39, and angle of view (2ω) is 61.3°–31.9°, thus providing a compact, thin, and a high optical capability lens with all aberrations suitably corrected.

Figure 7:
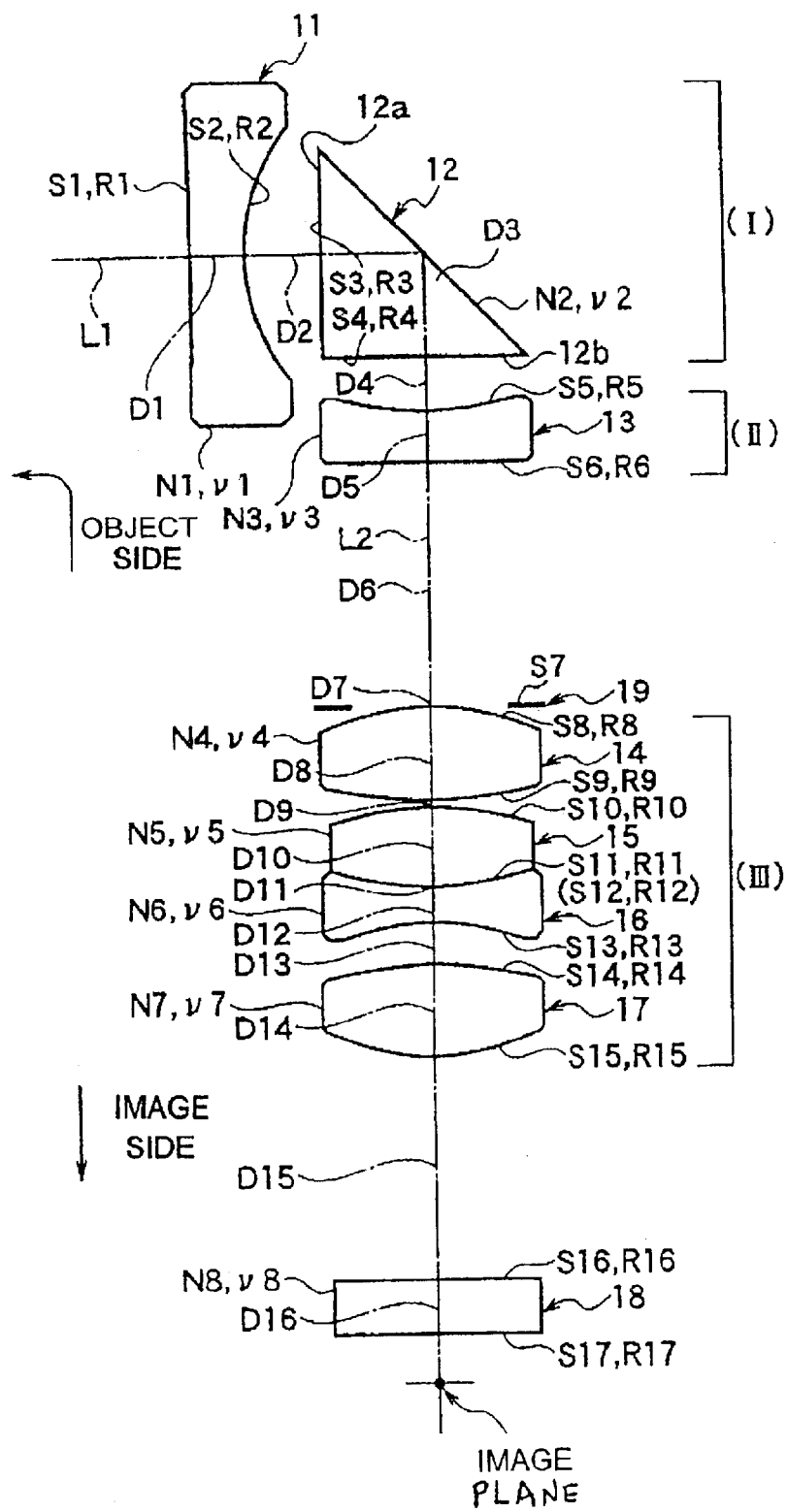
FIG. 7 is a drawing showing another embodiment of a zoom lens according to the present invention.

FIG. 7 and FIG. 8 show basic embodiments and views of zoom lens of another embodiment according to this invention. In this zoom lens, a first lens group (I) that has a negative refractive power as a whole, a second lens group (II) that has a negative refractive power as a whole and a third lens group (III) that has a positive refractive power as a whole are laid out in that order from the object side to the image plane side as shown in FIG. 7.

The first lens group (I) consists of a lens 11 that has a negative refractive power and a prism 12 that changes the light path. The second lens group (II) consists of a lens 13 that has a negative refractive power. The third lens group (III) consists of a lens 15 and a lens 14 having a positive refractive power, a lens 16 that has a negative refractive power connected to lens 15, and a lens 17 that has a positive refractive power.

The first lens group (1), the second lens group (II), and the third lens group (III) are formed to satisfy the aforementioned conditional formulas (1), (2) and (3). The lenses and the prisms that constitute them are partially made of glass, but primarily of plastics, so that they are light and inexpensive to manufacture.

In the above embodiment, a glass filter 18 such as an infrared cut filter or a low pass filter is provided on the image plane side relative to lens 17 of the third lens group (III), and an aperture stop 18 is provided between the second lens group (II) and the third lens group (III), i.e., between lens 13 and lens 14. Since aperture stop 18 is located in the position as mentioned above, it is possible to make the lens groups arrange on both sides of it to have approximately equal outer diameters, thus reducing the size as a whole.

In the above embodiment, the third lens group (III) moves from the image side to the object side, in other words, from the wide-angle end, shown in FIG. 8(*a*) to the telephoto end as shown in FIG. 8(*b*) to perform the zooming operation, while the second lens group (II) moves to correct the image plane change caused by the zooming operation. Since the depth dimension D of the lens and the lateral total length H of the lens (distance from prism 12 of the first lens group (I) to the image surface) are unchanged during the zooming operation, it can be easily mounted on cellular telephones, portable information terminals and the like where the mounting spaces are limited.

The surfaces of lens 11, prism 12, lens 13 through lens 17 are denoted Si (i=7–6, 8–15), the curvature radius of each surface Si is Ri (i=1–6, 8–15), the refractive ratio relative to line "d" is Ni, and the Abbe number is vi (i=1–7) as shown in FIG. 7.

As to glass filter 18, the surfaces are denoted Si (i=16, 17), the curvature radius of surface Si is Ri (i=16, 17), the refractive index relative to line "d" is N8, and the Abbe number is v8. Further, each space (thickness, air gap) located between lens 11 and glass filter 18 along the optical axis is denoted Di (i=1–16).

Since prism 12, similar to prism 2 in the aforementioned embodiment, has both entrance plane 12a and exit plane 12b formed rectangular in such a way that they are oblong in a direction perpendicular to a plane including entry axis L1 and exit axis L2 (see FIG. 3), the depth dimension D in the direction of entrance axis L1 can be minimized, thus making it possible to make the unit thinner.

Further in the above embodiment, a surface S2 with a smaller curvature radius among a surface S1 of the object side of lens 11 and surface S2 of image plane side is formed as an aspherical surface, wherein this aspherical surface is formed in such, a way that its negative refractive power weakens toward the periphery. As a result, corrections of various aberrations, in particular, correction of distortion, can be achieved.

A surface S8 of the objective side of lens 14 is formed as an aspherical surface. Consequently, various aberrations can be adjusted in a good balance, and spherical aberrations in particular can be corrected suitably. The aspherical surface is formed to satisfy the aforementioned formulas.

As an example using specific numerical values of the above embodiment, an embodiment 2 will be shown below. Table 5 shows the major dimensions of embodiment 2, Table 6 shows various numerical data (setup values), Table 7 shows numerical values of the aspheric surfaces, and Table 8 shows the focal length of the lens as a whole "f" (wide-angle end fw, middle position fm, and telephoto end ft) as well as numerical data concerning the spacing between the surfaces on the axis D4, D6 and D15 at the wide-angle end, middle position, and telephoto end specifically. In this example, the numerical data of the conditional formulas (1), (2) and (3) are: |fw/f1|=0.441 (fw=3.350 mm, f1=−8.157 mm), v1=56.4, and f3/|f2|=0.378(f2=−18.763 mm, f3=7.099 mm).

FIGS. 9a–9d, 10a–10d and 11a–11d are the aberration charts of spherical aberration, astigmatic aberration, distortion, and lateral chromatic aberration at the wide-angle end, middle position, and telephoto end respectively.

TABLE 5

| Object distance (mm) | Infinity (∞) | Total lateral length (prism to image plane) mm | 28.11 |
|---|---|---|---|
| Focal length (mm) | 3.35~4.75~6.44 | Back focus (air conversion) (mm) | 6.80~9.18~11.51 |
| F number | 2.86~3.50~4.22 | Angle of view (2ω) | 61.3°~43.0°~31.8° |
| Total lens length (front of lens 11 to image surface) (mm) | 31.06 | Focal length f1 (mm) | −8.157 |

TABLE 5-continued

| Object distance (mm) | Infinity (∞) | Total lateral length (prism to image plane) mm | 28.11 |
|---|---|---|---|
| Thickness of first lens group (depth) (mm) | 7.75 | Wide-angle end focal length fw (mm) | 3.350 |
| Thickness of second lens group (mm) | 1.25 | Focal length f2 (mm) | −18.763 |
| Thickness of third lens group (mm) | 7.95 | Focal length f3 (mm) | 7.099 |

TABLE 6

| Surface | Curvature radius (mm) | Distance(mm) | Refractive index ("d" line) | Abbe number |
|---|---|---|---|---|
| S1 | R1 −315.429 | D1 1.250 | N1 1.50914 | v1 56.4 |
| *S2 | R2 4.214 | | | |
| | | D2 1.700 | | |
| S3 | R3 ∞ | D3 4.800 | N2 1.50914 | v2 56.4 |
| S4 | R4 ∞ | | | |
| | | D4 variable | | |
| S5 | R5 −7.520 | D5 1.250 | N3 1.50914 | v3 56.4 |
| S6 | R6 −37.321 | | | |
| | | D6 variable | | |
| S7 | Aperture stop | | | |
| | | D7 0.000 | | |
| *S8 | R8 6.026 | D8 2.100 | N4 1.58385 | v4 30.3 |
| S9 | R9 −9.646 | | | |
| | | D9 0.200 | | |
| S10 | R10 6.810 | D10 1.850 | N5 1.51680 | v5 64.2 |
| S11 | R11 −6.810 | | | |
| | | D11 0.000 | | |
| S12 | R12 −6.810 | D12 0.800 | N6 1.80518 | v6 25.5 |
| S13 | R13 4.447 | | | |
| | | D13 1.000 | | |
| S14 | R14 9.569 | D14 2.000 | N7 1.50914 | v7 56.4 |
| S15 | R15 −5.857 | | | |
| | | D15 variable | | |
| S16 | R16 ∞ | D16 1.200 | N8 1.51680 | □7 64.2 |
| S17 | R17 ∞ | | | |

*Aspheric

TABLE 7

| Aspherical surface coefficient | | Numerical data |
|---|---|---|
| S2 surface | ε | 1.1419393 |
| | D | −0.1399480 × 10$^{-2}$ |
| | E | −0.3359319 × 10$^{-4}$ |
| | F | 0.4537005 × 10$^{-5}$ |
| | G | −0.8650274 × 10$^{-6}$ |
| S8 surface | ε | −0.2784433 |
| | D | −0.5958167 × 10$^{-3}$ |
| | E | 0.6184371 × 10$^{-4}$ |
| | F | −0.2760339 × 10$^{-5}$ |
| | G | −0.9278021 × 10$^{-6}$ |

TABLE 8

| | Wide-angle end | Middle position | Telephoto end |
|---|---|---|---|
| f (mm) | 3.35 (fw) | 4.75 (fm) | 6.44 (ft) |
| D4 (mm) | 1.200 | 2.323 | 1.253 |
| D6 (mm) | 5.700 | 2.200 | 0.930 |

TABLE 8-continued

|  | Wide-angle end | Middle position | Telephoto end |
|---|---|---|---|
| D15 (mm) | 5.007 | 7.384 | 9.724 |
| (Back focus 1.00 mm) | | | |

In the above embodiment 2, lens depth D (lens 11 to prism 12) is 7.75 mm, total lateral lens length (prism 12 to image surface) H when it is in use is 28.11 mm, total lens length (front S1 of lens 11 to image surface) is 31.06 mm, back focus (air equivalent) is 6.80 mm–11.51 mm, F number is 2.86–4.22, and angle of view (2ω) is 61.3°–31.8°, thus providing a compact, thin, and a high optical capability lens with all aberrations suitably corrected.

Figure 12:
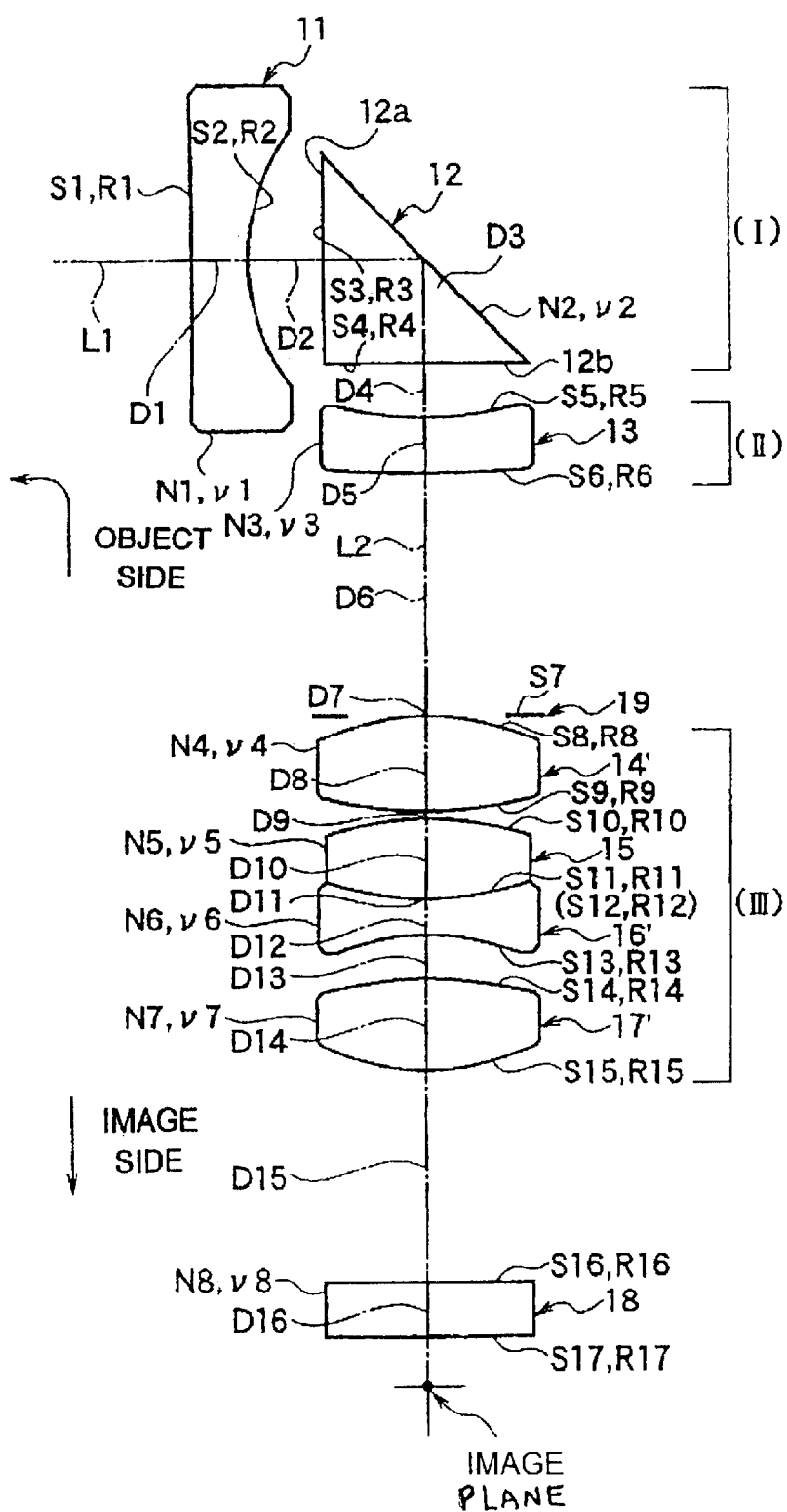
FIG. 12 is a drawing showing another embodiment of a zoom lens according to the present invention.
Figure 13:
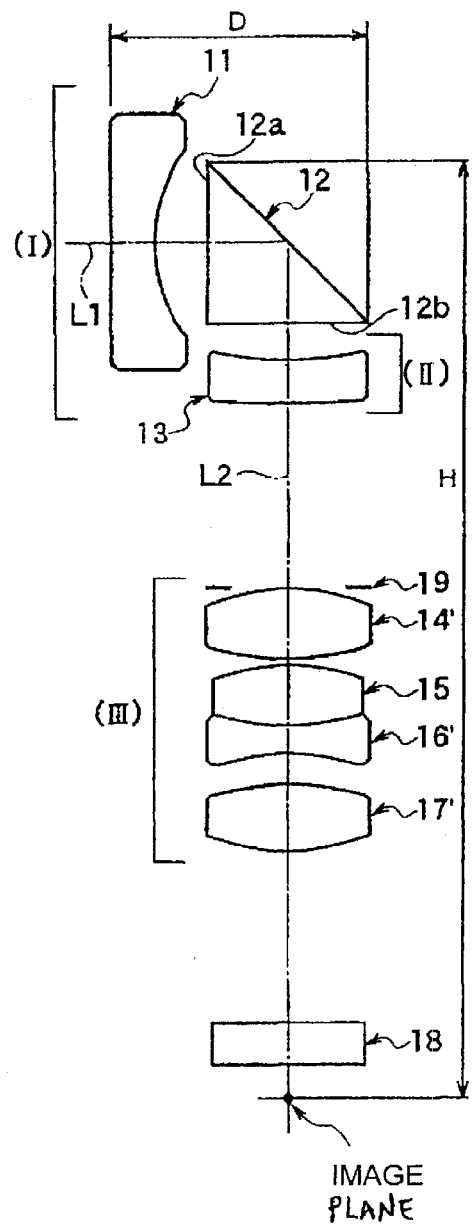
FIGS. 13(a) and (b) show the side views of the zoom lens shown in FIG. 12 at its wide-angle end and telephoto end.
Figure 13:
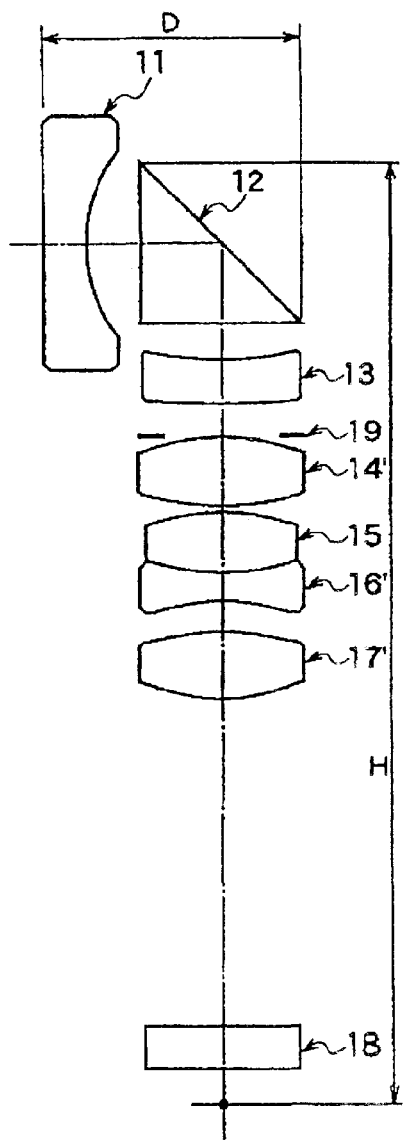

FIG. 12 and FIG. 13 show basic constitutions and views of zoom lens of other embodiments according to this invention. This zoom lens has an identical structure as those embodiments shown in FIG. 7 and FIG. 8 except that the specifications of lens 14', lens 16' and lens 17' are modified.

As an example using specific numerical values of the above embodiment, an embodiment 3 will be shown below. Table 9 shows the major dimensions of embodiment 3, Table 10 shows various numerical data (setup values), Table 11 shows numerical values of the aspheric surfaces, and Table 12 shows the focal length of the lens as a whole "f" (wide-angle end fw, middle position fm, and telephoto end ft) as well as numerical data concerning the spacing between the surfaces on the axis D4, D6 and D15 at the wide-angle end, middle position, and telephoto end specifically. In this example, the numerical data of the conditional formulas (1), (2) and (3) are: $|fw/f1|=0.441$ (fw=3.350 mm, f1=−8.157 mm), ν1=56.4, and $f3/|f2|=0.370$ (f2=−18.763 mm, f3=6.943 mm).

FIGS. 14a–14d, 15a–15d and 16a–d are the aberration charts of spherical aberration, astigmatic aberration, distortion, and lateral chromatic aberration at the wide-angle end, middle position; and telephoto end respectively.

TABLE 9

| Object distance (mm) | Infinity (∞) | Total lateral length (prism to image plane) mm | 27.73 |
|---|---|---|---|
| Focal length (mm) | 3.35~4.75~6.44 | Back focus (air conversion) (mm) | 6.42~8.74~11.03 |
| F number | 2.86~3.39~4.10 | Angle of view (2ω) | 62.01°~43.1°~31.8° |
| Total lens length (front of lens 11 to image surface) (mm) | 30.68 | Focal length f1 (mm) | −8.157 |
| Thickness of first lens group (depth) (mm) | 7.75 | Wide-angle end focal length fw (mm) | 3.350 |
| Thickness of second lens group (mm) | 1.25 | Focal length f2 (mm) | −18.763 |
| Thickness of third lens group (mm) | 7.95 | Focal length f3 (mm) | 6.943 |

TABLE 10

| Surface | Curvature radius (mm) | Distance(mm) | Refractive index ("d" line) | Abbe number |
|---|---|---|---|---|
| S1 | R1 −315.429 | D1 1.250 | N1 1.50914 | ν1 56.4 |
| *S2 | R2 4.214 | | | |
| | | D2 1.700 | | |
| S3 | R3 ∞ | D3 4.800 | N2 1.50914 | ν2 56.4 |
| S4 | R4 ∞ | | | |
| | | D4 variable | | |
| S5 | R5 −7.520 | D5 1.250 | N3 1.50914 | ν3 56.4 |
| S6 | R6 −37.321 | | | |
| | | D6 variable | | |
| S7 | Aperture stop | | | |
| | | D7 0.000 | | |
| *S8 | R8 6.687 | D8 2.100 | N4 1.68893 | ν4 31.2 |
| S9 | R9 −11.062 | | | |
| | | D9 0.200 | | |
| S10 | R10 6.810 | D10 1.850 | N5 1.51680 | ν5 64.2 |
| S11 | R11 −6.810 | | | |
| | | D11 0.000 | | |
| S12 | R12 6.810 | D12 0.800 | N6 1.80518 | ν6 25.5 |
| S13 | R13 4.416 | | | |
| | | D13 1.000 | | |
| S14 | R14 10.599 | D14 2.000 | N7 1.50914 | ν7 56.4 |
| S15 | R15 −6.099 | | | |
| | | D15 variable | | |
| S16 | R16 ∞ | D16 1.200 | N8 1.51680 | ν8 64.2 |
| S17 | R17 ∞ | | | |

*Aspheric

TABLE 11

| Aspherical surface coefficient | | Numerical data |
|---|---|---|
| S2 surface | ε | 1.2078700 |
| | D | −0.1696780 × 10⁻² |
| | E | 0.7620015 × 10⁻⁴ |
| | F | −0.6060053 × 10⁻⁵ |
| | G | −0.6619714 × 10⁻⁶ |
| S8 surface | ε | 0.0000000 |
| | D | −0.6213306 × 10⁻³ |
| | E | 0.8818258 × 10⁻⁴ |
| | F | −0.5543206 × 10⁻⁵ |
| | G | −0.1293282 × 10⁻⁵ |

TABLE 12

|  | Wide-angle end | Middle position | Telephoto end |
|---|---|---|---|
| f (mm) | 3.35 (fw) | 4.75 (fm) | 6.44 (ft) |
| D4 (mm) | 1.200 | 2.299 | 1.252 |
| D6 (mm) | 5.700 | 2.281 | 1.035 |
| D15 (mm) | 4.628 | 6.948 | 9.241 |

(Back focus 1.00 mm)

In the above embodiment 3, lens depth D (lens 11 to prism 12) is 7.75 mm, total lateral lens length (prism 12 to image surface) H when it is in use is 27.73 mm, total lens length (front S1 of lens 11 to image surface) is 30.68 mm, back focus (air equivalent) is 6.42 mm–11.03 mm, F number is 2.86–4.10, and angle of view (2ω) is 62.0°–31.8°, thus providing a compact, thin, and a high optical capability lens with all aberrations suitably corrected.

Figure 17:
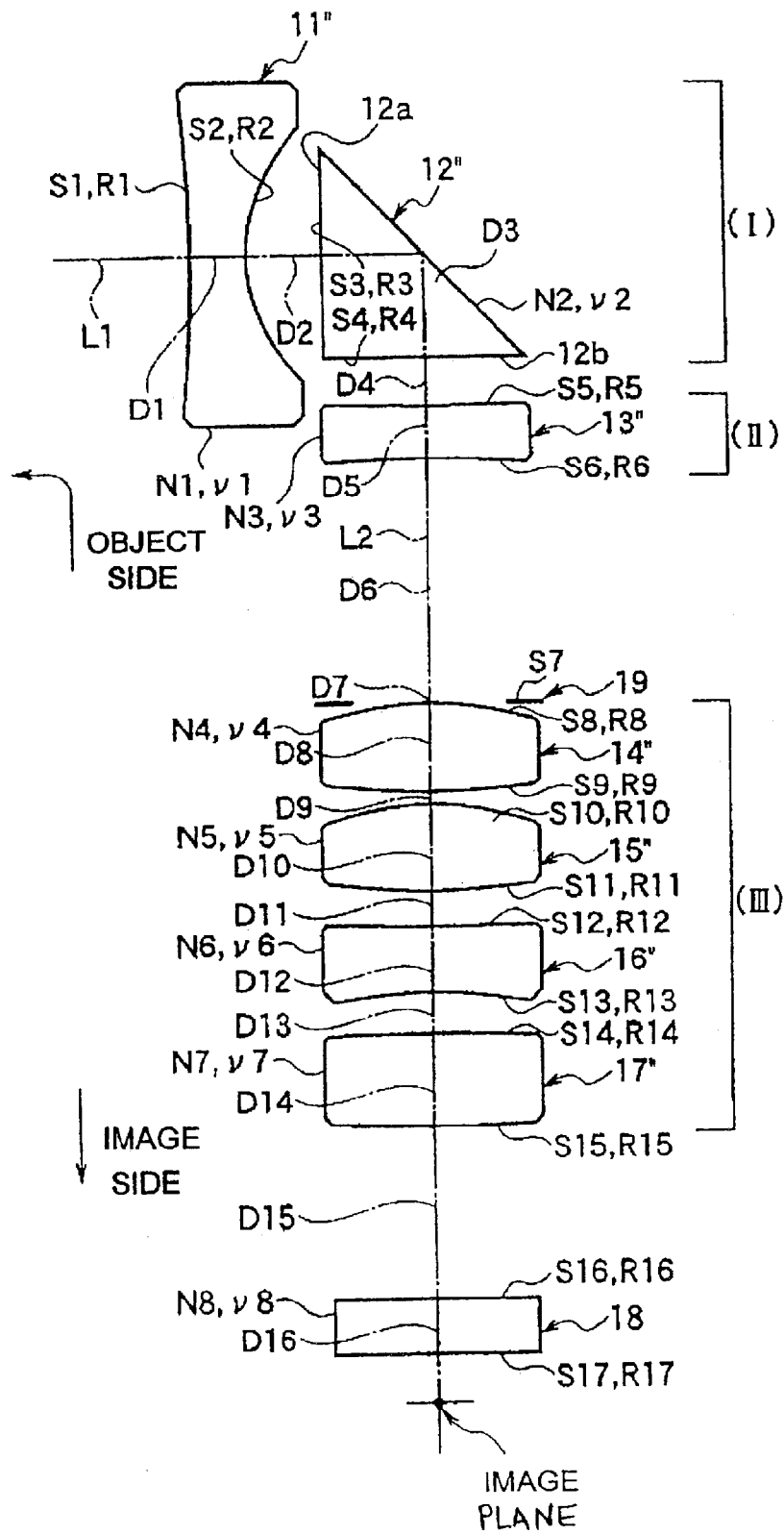
FIG. 17 is a drawing showing yet another embodiment of a zoom lens according to the present invention.
Figure 18A:
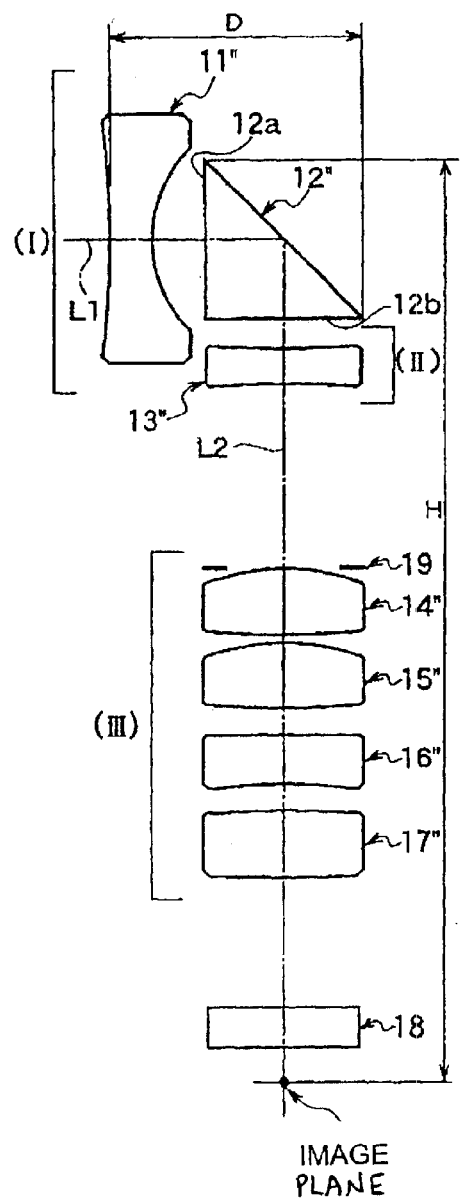
FIGS. 18(a) and (b) show the side views of the zoom lens shown in FIG. 17 at its wide-angle end and telephoto end.
Figure 18B:
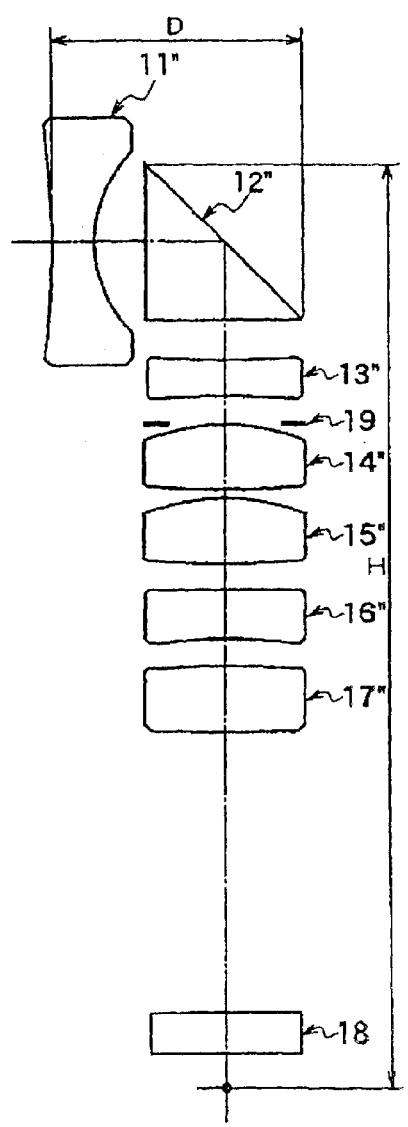

FIG. 17 and FIG. 18 show basic constitutions and views of a zoom lens of yet another embodiment according to this invention. This zoom lens has an identical structure as those embodiments shown in FIG. 7 and FIG. 8 except that the specifications of lens 11", lens 12", lens 13" through lens 17" are modified, lens 15" and lens 16" are separated, and an image side surface 13 of lens 16" and an object side surface 14 of lens 17" are formed aspherical.

As an example using specific numerical values of the above embodiment, an embodiment 4 will be shown below. Table 13 shows the major dimensions of embodiment 4, Table 14 shows various numerical data (setup values), Table 15 shows numerical values of the aspheric surfaces, and Table 16 shows the focal length of the lens as a whole "f" (wide-angle end fw, middle position fm, and telephoto end ft) as well as numerical data concerning the spacing between the surfaces on the axis D4, D6 and D15 at the wide-angle end, middle position, and telephoto end specifically. In this example, the numerical data of the conditional formulas (1), (2) and (3) are: |fw/f1|=0.556 (fw=3.350 mm, f1=−6.023 mm), ν1=56.4, and f3/|f2|=0.157 (f2=−43.986 mm, f3=6.921 mm).

FIGS. 19a–19d, 20a–20d and 21a–d are the aberration charts of spherical aberration, astigmatic aberration, distortion, and lateral chromatic aberration at the wide-angle end, middle position, and telephoto end respectively.

TABLE 13

| Object distance (mm) | Infinity (∞) | Total lateral length (prism to image plane) mm | 28.15 |
|---|---|---|---|
| Focal length (mm) | 3.35~4.75~ 6.44 | Back focus (air conversion) (mm) | 5.59~7.89~ 10.18 |
| F number | 2.88~3.53~ 4.39 | Angle of view (2ω) | 61.4°~43.0°~ 31.7° |
| Total lens length (front of lens 11" to image surface) (mm) | 31.10 | Focal length f1 (mm) | −6.023 |
| Thickness of first lens group (depth) (mm) | 7.65 | Wide-angle end focal length fw (mm) | 3.350 |
| Thickness of second lens group (mm) | 1.25 | Focal length f2 (mm) | −43.986 |
| Thickness of third lens group (mm) | 9.50 | Focal length f3 (mm) | 6.921 |

TABLE 14

| Surface | Curvature radius (mm) | Distance(mm) | Refractive index ("d" line) | Abbe number |
|---|---|---|---|---|
| S1 | R1 −30.895 | D1 1.250 | N1 1.50914 | ν1 56.4 |
| *S2 | R2 3.451 | | | |
| | | D2 1.700 | | |
| S3 | R3 ∞ | D3 4.700 | N2 1.58385 | ν2 30.3 |
| S4 | R4 ∞ | | | |
| | | D4 variable | | |
| S5 | R5 −45.000 | D5 1.250 | N3 1.50914 | ν3 56.4 |
| S6 | R6 45.000 | | | |
| | | D6 variable | | |
| S7 | Aperture stop | | | |
| | | D7 0.000 | | |
| *S8 | R8 7.694 | D8 2.000 | N4 1.50914 | ν4 56.4 |
| S9 | R9 −21.108 | | | |
| | | D9 0.300 | | |
| S10 | R10 7.738 | D10 2.000 | N5 1.48749 | ν5 70.4 |
| S11 | R11 −14.932 | | | |
| | | D11 0.800 | | |
| S12 | R12 −37.395 | D12 1.500 | N6 1.58385 | ν6 30.3 |
| *S13 | R13 10.472 | | | |
| | | D13 0.900 | | |
| *S14 | R14 17.002 | D14 2.000 | N7 1.50914 | ν7 56.4 |
| S15 | R15 −59.703 | | | |
| | | D15 variable | | |
| S16 | R16 ∞ | D16 1.200 | N8 1.51680 | ν8 64.2 |
| S17 | R17 ∞ | | | |

*Aspheric

TABLE 15

| Aspherical surface coefficient | | Numerical data |
|---|---|---|
| S2 surface | ε | 0.5530000 |
| | D | −0.9247500 × 10$^{-3}$ |
| | E | 0.4103685 × 10$^{-4}$ |
| | F | 0.2631008 × 10$^{-5}$ |
| | G | −0.3268380 × 10$^{-6}$ |
| S8 surface | ε | −3.5000000 |
| | D | 0.4864181 × 10$^{-3}$ |
| | E | 0.6721384 × 10$^{-4}$ |
| | F | −0.6822639 × 10$^{-5}$ |
| | G | −0.1395979 × 10$^{-5}$ |
| S13 surface | ε | −10.3000000 |
| | D | −0.7456721 × 10$^{-4}$ |
| | E | −0.1483760 × 10$^{-3}$ |
| | F | −0.1886347 × 10$^{-4}$ |
| | G | −0.9735793 × 10$^{-6}$ |
| S14 surface | ε | −65.0000000 |
| | D | −0.1716089 × 10$^{-2}$ |
| | E | −0.2455649 × 10$^{-3}$ |
| | F | −0.1227574 × 10$^{-4}$ |
| | G | −0.9496339 × 10$^{-5}$ |

TABLE 16

| | Wide-angle end | Middle position | Telephoto end |
|---|---|---|---|
| f (mm) | 3.35 | 4.75 | 6.44 |
| | (fw) | (fm) | (ft) |
| D4 (mm) | 1.000 | 2.977 | 1.301 |
| D6 (mm) | 5.700 | 1.423 | 0.814 |
| D15 (mm) | 3.800 | 6.100 | 8.385 |

(Back focus 1.00 mm)

In the above embodiment 4, lens depth D (lens 11" to prism 12") is 7.65 mm, total lateral lens length (prism 12" to image surface) H when it is in use is 28.15 mm, total lens length (front S1 of lens 11" to image surface) is 31.10 mm, back focus (air equivalent) is 5.59 mm–10.18 mm, F number is 2.88–4.39, and angle of view (2ω) is 61.4°–31.7°, thus providing a compact, thin, and a high optical capability lens with all aberrations suitably corrected.

What is claimed is:

1. A zoom lens comprising:

a first lens group having a negative refractive power as a whole, a second lens group having a negative refractive power as a whole, and a third lens group having a positive refractive power as a whole, arranged in said order from object side to image side, for zooming from a wide-angle end to a telephoto end by moving said third lens group from an image plane side to an object side as well as for correcting image plane changes required in accordance with said zooming by moving said second lens group; wherein said first lens group consists of a lens having a negative refractive power and a prism for changing a light path arranged in said order from the object side, said second lens group consists of a lens having a negative refractive power; and an aperture stop is provided between said second lens group and said third lens group.

2. A zoom lens claimed in claim 1 wherein, said first lens group's lens has an aspherical surface.

3. A zoom lens claimed in claim 2 wherein,
said aspherical surface is formed on a surface with a smaller curvature radius.

4. A zoom lens claimed in claim 3 wherein,
said aspherical surface is formed to have a weaker negative refractive power weakening toward its periphery.

5. A zoom lens claimed in claim 2 wherein,
said third lens group has at least one lens with a positive refractive power and at least one lens with a negative refractive power.

6. A zoom lens claimed in claim 2 wherein,
the prism of said first lens group is formed to have an entrance surface and an exit surface both oblong in a direction perpendicular to a plane that includes an entrance axis and an exit axis.

7. A zoom lens claimed in claim 2 that satisfies the following equations (1) and (2):

$$0.25 < |fw/f1| < 0.7, \quad (1)$$

$$v1 > 40, \quad (2)$$

where f1: focal length of the first lens group, fw: focal length of the total lens system at the wide-angle end, and v1: Abbe number of the first lens group's lens.

8. A zoom lens claimed in claim 2 that satisfies the following equation (3):

$$0.1 < f3/|f2| < 0.8, \quad (3)$$

where f2: focal length of the second lens group, and f3: focal length of the third lens group.

9. A zoom lens claimed in claim 1 wherein,
said third lens group has at least one lens with a positive refractive power and at least one lens with a negative refractive power.

10. A zoom lens claimed in claim 9 wherein,
said third lens group has a lens at a position closest to the object having a positive refractive power and an aspherical surface at least on one side.

11. A zoom lens claimed in claim 1 wherein,
the prism of said first lens group is formed to have an entrance surface and an exit surface both oblong in a direction perpendicular to a plane that includes an entrance axis and an exit axis.

12. A zoom lens claimed in claim 1 wherein, said first lens group's lens has an aspherical surface.

13. A zoom lens claimed in claim 1 wherein,
said third lens group has at least one lens with a positive refractive power and at least one lens with a negative refractive power.

14. A zoom lens claimed in claim 1 wherein,
the prism of said first lens group is formed to have an entrance surface and an exit surface both oblong in a direction perpendicular to a plane that includes an entrance axis and an exit axis.

15. A zoom lens claimed in claim 1 that satisfies the following equations (1) and(2):

$$0.25 < |fw/f1| < 0.7, \quad (1)$$

$$v1 < 40, \quad (2)$$

where f1: focal length of the first lens group, fw: focal length of the total lens system at the wide-angle end, and v1: Abbe number of the first lens group's lens.

16. A zoom lens claimed in claim 1 that satisfies the following equation (3):

$$0.1 < f3/|f2| < 0.8, \quad (3)$$

where f2: focal length of the second lens group, and f3: focal length of the third lens group.

17. A zoom lens claimed in claim 1, wherein the zoom lens comprises less than nine optical elements.

18. A zoom lens claimed in claim 1, wherein the zoom lens comprises less than seven lenses.

19. A zoom lens claimed in claim 1, wherein the prism of the first lens group is positioned adjacent to the lens of the first lens group and is positioned adjacent to the lens of the second lens group.

20. A zoom lens claimed in claim 1, wherein an exit surface of the prism at least partially faces the lens of the second lens group.

21. A zoom lens comprising:

a first lens group having a negative refractive power as a whole, a second lens group having a negative refractive power as a whole, and a third lens a group having a positive refractive power as a whole, arranged in said order from an object side to an image plane side, for zooming from a wide-angle end to a telephoto end by moving said third lens group from the image plane side to the object side as well as for correcting image plane changes required in accordance with said zooming by moving said second lens group; wherein said first lens group consists of a lens having a negative refractive power and a prism for changing a light path arranged in said order from the object side, and said zoom lens satisfies the following equations (1) and (2):

$$0.25 < |fw/f1| < 0.7, \quad (1)$$

$$v1 < 40, \quad (2)$$

where f1: focal length of the first lens group, fw: focal length of the total lens system at the wide-angle end, and v1: Abbe number of the first lens group's lens.

22. A zoom lens claimed in claim 21 that satisfies the following equation (3):

$$0.1 < f3/|f2| < 0.8, \quad (3)$$

where f2: focal length of the second lens group, and f3: focal length of the third lens group.

23. A zoom lens claimed in claim 21 that satisfies the following equation (3):

$$0.1 < f3/|f2| < 0.8, \quad (3)$$

where f2: focal length of the second lens group, and f3: focal length of the third lens group.

* * * * *